US008527867B2

(12) United States Patent
Nair et al.

(10) Patent No.: US 8,527,867 B2
(45) Date of Patent: Sep. 3, 2013

(54) ENABLING USERS TO EDIT VERY LARGE XML DATA

(75) Inventors: Roopesh Nair, Mysore (IN); Lokesh Mathur, Jaipur (IN); Mugunthan Srinivasan, Hyderabad (IN); Srikrishna Bandi, Hyderabad (IN); Gaurav Gupta, Greater Noida (IN)

(73) Assignee: Oracle International Corporation, Redwood Shores, CA (US)

( * ) Notice: Subject to any disclaimer, the term of this patent is extended or adjusted under 35 U.S.C. 154(b) by 1175 days.

(21) Appl. No.: 12/016,205

(22) Filed: Jan. 18, 2008

(65) Prior Publication Data

US 2009/0187530 A1 Jul. 23, 2009

(51) Int. Cl.
*G06F 17/00* (2006.01)

(52) U.S. Cl.
USPC ............................ 715/227; 707/760; 715/234

(58) Field of Classification Search
USPC .......................................................... 715/227
See application file for complete search history.

(56) References Cited

U.S. PATENT DOCUMENTS 6,279,006 B1 * 8/2001 Shigemi et al. ........................ 1/1
6,366,934 B1 * 4/2002 Cheng et al. .................. 715/210
6,658,429 B2 * 12/2003 Dorsett, Jr. .................... 707/708
7,409,413 B2 * 8/2008 Martinez et al. .............. 707/702
7,516,139 B2 * 4/2009 Ziemann et al. ..................... 1/1
7,873,627 B2 * 1/2011 Grabs et al. ................... 707/713
8,180,806 B2 * 5/2012 Ackerman et al. ............ 707/803
8,255,432 B2 * 8/2012 Ackerman et al. ............ 707/809
2002/0133484 A1 * 9/2002 Chau et al. ........................ 707/3
2002/0143521 A1 * 10/2002 Call ................................. 704/1
2002/0156772 A1 * 10/2002 Chau et al. ........................ 707/3
2002/0169788 A1 * 11/2002 Lee et al. ................... 707/104.1
2003/0140308 A1 * 7/2003 Murthy et al. ................ 715/500
2003/0212664 A1 * 11/2003 Breining et al. .................. 707/3
2004/0064466 A1 * 4/2004 Manikutty et al. ............ 707/100
2004/0088415 A1 * 5/2004 Chandrasekar et al. ...... 709/226
2004/0220912 A1 * 11/2004 Manikutty et al. ................ 707/3
2005/0044113 A1 * 2/2005 Manikutty et al. ......... 707/104.1
2005/0055336 A1 * 3/2005 Hui et al. .......................... 707/3
2005/0165815 A1 * 7/2005 Ozzie et al. ................... 707/100
2006/0036631 A1 * 2/2006 Cheslow ....................... 707/101

(Continued)

OTHER PUBLICATIONS

Knudsen et al. "RELAXML: Bidirectional Transfer between Relational and XML Data", 2005, pp. 1-12, URL:<http://ieeexplore.ieee.org/stamp/stamp.jsp?tp=&arnumber=1540905>.*

(Continued)

*Primary Examiner* — Laurie Ries
*Assistant Examiner* — Mustafa Amin
(74) *Attorney, Agent, or Firm* — Narendra Reddy Thappeta

(57) ABSTRACT

Enabling users to edit data encoded in extended markup language (XML). In one embodiment, an XML data to be edited is received and preprocessed to generate a tabular data corresponding to the XML data. The generated tabular data is stored in the form of a staging table in a database. On receiving a request indicating that a portion of the XML data is to be replaced by a new portion, a query corresponding to the request is generated. The query is directed to the staging table in the database and is designed to cause the portion to be replaced by the new portion in the tabular data. The query is then performed on the database to replace the portion with the new portion in the tabular data. Once the edits are completed, new XML data containing the edits is constructed from the modified tabular data.

22 Claims, 25 Drawing Sheets

(56) References Cited

U.S. PATENT DOCUMENTS

| | | | | |
|---|---|---|---|---|
| 2007/0150432 | A1 * | 6/2007 | Chandrasekar et al. | 707/1 |
| 2007/0239762 | A1 * | 10/2007 | Farahbod | 707/102 |
| 2007/0288840 | A1 * | 12/2007 | Girle et al. | 715/513 |
| 2008/0306983 | A1 * | 12/2008 | Singh | 707/102 |
| 2009/0138790 | A1 * | 5/2009 | Larcheveque et al. | 715/224 |

OTHER PUBLICATIONS

Wang et al. "DBXML—Connecting XML with Relational Databases", 2005, pp. 1-6, URL:<http://ieeexplore.ieee.org/stamp/stamp.jsp?tp=&arnumber=1562640>.*

Guardalben et al., "Integrating XML and Relational Database Technologies: A Position Paper", Aug. 12, 2004, pp. 1-32, URL:<http://www.nocomsoftware.no/website1/50.0.1.0/43/integrating_xml_white_paper.pdf>.*

Jacinto et al., "Bidrectional Conversion between XML documents and Relational Data Bases", pp. 1-7, retrieved on May 9, 2013, URL:<http://ieeexplore.ieee.org/stamp/stamp.jsp?tp=&arnumber=1047728>.*

Varlamis et al. "Bridging XML-Schema and relational databases.A system for generating and manipulating relational databases using valid XML documents", pp. 1-10, 2001, URL:<http://delivery.acm.org/10.1145/510000/502203/p105-varlamis.pdf?ip=151.207.250.11&acc=ACTIVE%20SERVICE&key=986B26D8D17D60C8AAC6AC1B60173C4E&CFID=211740892&CFTOKEN=80823398&_>.*

Gasch, "XML Schema driven Database Management of Speech Corpus Metadata", 2008, pp. 1-11, URL:<http://oreilly.com/catalog/orxmlapp/chapter/ch07.pdf>.*

"Transforming XML with XSLT", Feb. 1, 2001, pp. 1-35, URL:<http://oreilly.com/catalog/orxmlapp/chapter/ch07.pdf >.*

"Administering—Mapping and importing XML schemas into DB2 Content Manager", released on Jun. 16, 2008, pp. 1-18, URL:<http://publib.boulder.ibm.com/infocenter/cmx/v8r3m0/index.jsp?topic=%2Fcom.ibm.sysadmin.hlp%2Fmddh2057.htm>.*

"Programming—How XML services work with other DB2 Content Manager programming", pp. 1-2, released Jun. 16, 2008, URL:<http://publib.boulder.ibm.com/infocenter/cmx/v8r3m0/index.jsp?topic=%2Fcom.ibm.sysadmin.hlp%2Fmddh2057.htm>.*

Geeoff Lee et al, "Oracle Database 11G XML DB Technical Overview", White Paper, Date: Jul. 2007, pp. 1-36, Oracle Corporation, USA, Available at http://www.oracle.com/technetwork/database/features/xmldb/xmldb-11g-twp-132368.pdf.

* cited by examiner

```
701: <?xml version="1.0" encoding="UTF-8" ?>
702: <CalendarSetupAM ID="BE" MIN_API_VERSION="120.5">
703: <PeriodSetsVO ID="VIEW">
704:    <PeriodSetsVO>
705:        <PeriodSetName>JEBE_MONTH_VAT</PeriodSetName>
706:        <Description>Belgian Localisation Monthly VAT Calendar</Description>
707:        <Context />
708:        <PeriodsVO>
709:            <PeriodName>JAN-2001</PeriodName>
710:            <StartDate>2001-01-01</StartDate>
711:            <EndDate>2001-01-31</EndDate>
712:            <PeriodYear>2001</PeriodYear>
713:            <PeriodNum>1</PeriodNum>
714:            <QuarterNum>1</QuarterNum>
715:            <EnteredPeriodName>JAN</EnteredPeriodName>
716:            <AdjustmentPeriodFlag>N</AdjustmentPeriodFlag>
717:            <Description />
718:            <Context />
719:            <UserPeriodType>Month</UserPeriodType>
720:        </PeriodsVO>
721:        <PeriodsVO>
722:            <PeriodName>FEB-2001</PeriodName>
723:            <StartDate>2001-02-01</StartDate>
724:            <EndDate>2001-02-28</EndDate>
725:            <PeriodYear>2001</PeriodYear>
726:            <PeriodNum>2</PeriodNum>
727:            <QuarterNum>1</QuarterNum>
728:            <EnteredPeriodName>FEB</EnteredPeriodName>
729:            <AdjustmentPeriodFlag>N</AdjustmentPeriodFlag>
730:            <Description />
731:            <Context />
732:            <UserPeriodType>Month</UserPeriodType>
733:        </PeriodsVO>
```

*FIG. 7A*

```
    <PeriodsVO>
        <PeriodName>MAR-2001</PeriodName>
        <StartDate>2001-03-01</StartDate>
        <EndDate>2001-03-31</EndDate>
        <PeriodYear>2001</PeriodYear>
        <PeriodNum>3</PeriodNum>
        <QuarterNum>1</QuarterNum>
        <EnteredPeriodName>MAR</EnteredPeriodName>
        <AdjustmentPeriodFlag>N</AdjustmentPeriodFlag>
        <Description />
        <Context />
        <UserPeriodType>Month</UserPeriodType>
    </PeriodsVO>
    <PeriodsVO>
        <PeriodName>APR-2001</PeriodName>
        <StartDate>2001-04-01</StartDate>
        <EndDate>2001-04-30</EndDate>
        <PeriodYear>2001</PeriodYear>
        <PeriodNum>4</PeriodNum>
        <QuarterNum>2</QuarterNum>
        <EnteredPeriodName>APR</EnteredPeriodName>
        <AdjustmentPeriodFlag>N</AdjustmentPeriodFlag>
        <Description />
        <Context />
        <UserPeriodType>Month</UserPeriodType>
    </PeriodsVO>
</PeriodSetsVO>
<PeriodSetsVO>
    <PeriodSetName>GL_CALENDAR</PeriodSetName>
    <Description>GL ACCOUNTING CALENDAR</Description>
    <Context />
```

*FIG. 7B*

```
        <PeriodsVO>
            <PeriodName>JAN-W4-05</PeriodName>
            <StartDate>2005-01-17</StartDate>
            <EndDate>2005-01-23</EndDate>
            <PeriodYear>2005</PeriodYear>
            <PeriodNum>4</PeriodNum>
            <QuarterNum>1</QuarterNum>
            <EnteredPeriodName>JAN-W4</EnteredPeriodName>
            <AdjustmentPeriodFlag>N</AdjustmentPeriodFlag>
            <Description />
            <Context />
            <UserPeriodType>Weekly</UserPeriodType>
        </PeriodsVO>
        <PeriodsVO>
            <PeriodName>FEB-W1-05</PeriodName>
            <StartDate>2005-01-24</StartDate>
            <EndDate>2005-01-30</EndDate>
            <PeriodYear>2005</PeriodYear>
            <PeriodNum>5</PeriodNum>
            <QuarterNum>1</QuarterNum>
            <EnteredPeriodName>FEB-W1</EnteredPeriodName>
            <AdjustmentPeriodFlag>N</AdjustmentPeriodFlag>
            <Description />
            <Context />
            <UserPeriodType>Weekly</UserPeriodType>
        </PeriodsVO>
    </PeriodSetsVO>
</PeriodSetsVO>
</CalendarSetupAM>
```

FIG. 7C

```
821: # All keys for a given record/element are specified as comma-separated values
822: PeriodSetsVO = PeriodSetName
823: # PeriodsVO = PeriodName, UserPeriodType
```

FIG. 8A

```
851: # All editable elements/attributes for a given record/element are specified as comma-separated values
852: PeriodSetsVO = PeriodSetName
853: PeriodsVO = PeriodName, EnteredPeriodName
```

FIG. 8B

```
901: <?xml version="1.0" encoding="UTF-8" ?>
902: <EXT primary="true" req_id="123400" source="PeriodSets">
903:     <H DP="1">
904:         <F>-2</F> <T>-1</T> <ID>1</ID> <PID>0</PID>
905:         <HC>-1619009062</HC> <HD>1CalendarSetupAM</HD>
906:         <S>PeriodSets</S> <N>CalendarSetupAM</N> <D>Calendar Setup</D>
907:     </H>
908:     <H DP="3">
909:         <T>0</T> <ID>3</ID> <PID>1</PID>
910:         <HC>-600601129</HC> <HD>3PeriodSetsVOPeriodSetNameJEBE_MONTH_VAT</HD>
911:         <S>PeriodSets</S> <N>PeriodSetsVO</N> <D>Period Sets</D>
912:         <V N="PeriodSetName" U="Y" D="Period Set Name" T="1">JEBE_MONTH_VAT</V>
913:         <V N="Description" D="Description" T="0">Belgian Localisation Monthly VAT Calendar</V>
914:         <V N="Context" D="Context" T="0" />
915:     </H>
916:     <H DP="4">
917:         <T>2</T> <ID>5</ID> <PID>3</PID>
918:         <HC>941816631</HC> <HD>4PeriodsVO</HD>
919:         <S>PeriodSets</S> <N>PeriodsVO</N> <D>Periods</D>
920:         <V N="PeriodName" D="Period Name" T="0">JAN-2001</V>
921:         <V N="StartDate" D="Start Date" T="0">2001-01-01</V>
922:         <V N="EndDate" D="End Date" T="0">2001-01-31</V>
923:         <V N="PeriodYear" D="Period Year" T="0">2001</V>
924:         <V N="PeriodNum" D="Period Num" T="0">1</V>
925:         <V N="QuarterNum" D="Quarter Num" T="0">1</V>
926:         <V N="EnteredPeriodName" D="Entered Period Name" T="0">JAN</V>
927:         <V N="AdjustmentPeriodFlag" D="Adjustment Period Flag" T="0">N</V>
928:         <V N="Description" D="Description" T="0" />
929:         <V N="Context" D="Context" T="0" />
930:         <V N="UserPeriodType" D="User Period Type" T="0">Month</V>
931:     </H>
```

*FIG. 9A*

```
<H DP="4">
    <T>2</T> <ID>7</ID> <PID>3</PID>
    <HC>941816631</HC> <HD>4PeriodsVO</HD>
    <S>PeriodSets</S> <N>PeriodsVO</N> <D>Periods</D>
    <V N="PeriodName" D="Period Name" T="0">FEB-2001</V>
    <V N="StartDate" D="Start Date" T="0">2001-02-01</V>
    <V N="EndDate" D="End Date" T="0">2001-02-28</V>
    <V N="PeriodYear" D="Period Year" T="0">2001</V>
    <V N="PeriodNum" D="Period Num" T="0">2</V>
    <V N="QuarterNum" D="Quarter Num" T="0">1</V>
    <V N="EnteredPeriodName" D="Entered Period Name" T="0">FEB</V>
    <V N="AdjustmentPeriodFlag" D="Adjustment Period Flag" T="0">N</V>
    <V N="Description" D="Description" T="0" />
    <V N="Context" D="Context" T="0" />
    <V N="UserPeriodType" D="User Period Type" T="0">Month</V>
</H>
<H DP="4">
    <T>2</T> <ID>9</ID> <PID>3</PID>
    <HC>941816631</HC> <HD>4PeriodsVO</HD>
    <S>PeriodSets</S> <N>PeriodsVO</N> <D>Periods</D>
    <V N="PeriodName" D="Period Name" T="0">MAR-2001</V>
    <V N="StartDate" D="Start Date" T="0">2001-03-01</V>
    <V N="EndDate" D="End Date" T="0">2001-03-31</V>
    <V N="PeriodYear" D="Period Year" T="0">2001</V>
    <V N="PeriodNum" D="Period Num" T="0">3</V>
    <V N="QuarterNum" D="Quarter Num" T="0">1</V>
    <V N="EnteredPeriodName" D="Entered Period Name" T="0">MAR</V>
    <V N="AdjustmentPeriodFlag" D="Adjustment Period Flag" T="0">N</V>
    <V N="Description" D="Description" T="0" />
    <V N="Context" D="Context" T="0" />
    <V N="UserPeriodType" D="User Period Type" T="0">Month</V>
</H>
```

*FIG. 9B*

```
<H DP="4">
    <T>2</T> <ID>11</ID> <PID>3</PID>
    <HC>941816631</HC> <HD>4PeriodsVO</HD>
    <S>PeriodSets</S> <N>PeriodsVO</N> <D>Periods</D>
    <V N="PeriodName" D="Period Name" T="0">APR-2001</V>
    <V N="StartDate" D="Start Date" T="0">2001-04-01</V>
    <V N="EndDate" D="End Date" T="0">2001-04-30</V>
    <V N="PeriodYear" D="Period Year" T="0">2001</V>
    <V N="PeriodNum" D="Period Num" T="0">4</V>
    <V N="QuarterNum" D="Quarter Num" T="0">2</V>
    <V N="EnteredPeriodName" D="Entered Period Name" T="0">APR</V>
    <V N="AdjustmentPeriodFlag" D="Adjustment Period Flag" T="0">N</V>
    <V N="Description" D="Description" T="0" />
    <V N="Context" D="Context" T="0" />
    <V N="UserPeriodType" D="User Period Type" T="0">Month</V>
</H>
<H DP="3">
    <T>0</T> <ID>13</ID> <PID>1</PID>
    <HC>-710891862</HC> <HD>3PeriodSetsVOPeriodSetNameGL_CALENDAR</HD>
    <S>PeriodSets</S> <N>PeriodSetsVO</N> <D>Period Sets</D>
    <V N="PeriodSetName" U="Y" D="Period Set Name" T="1">GL_CALENDAR</V>
    <V N="Description" D="Description" T="0">GL ACCOUNTING CALENDAR</V>
    <V N="Context" D="Context" T="0" />
</H>
```

FIG. 9C

```
988:  <H DP="4">
989:    <T>2</T> <ID>15</ID> <PID>13</PID>
990:    <HC>941816631</HC> <HD>4PeriodsVO</HD>
991:    <S>PeriodSets</S> <N>PeriodsVO</N> <D>Periods</D>
992:    <V N="PeriodName" D="Period Name" T="0">JAN-W4-05</V>
993:    <V N="StartDate" D="Start Date" T="0">2005-01-17</V>
994:    <V N="EndDate" D="End Date" T="0">2005-01-23</V>
995:    <V N="PeriodYear" D="Period Year" T="0">2005</V>
996:    <V N="PeriodNum" D="Period Num" T="0">4</V>
997:    <V N="QuarterNum" D="Quarter Num" T="0">1</V>
998:    <V N="EnteredPeriodName" D="Entered Period Name" T="0">JAN-W4</V>
999:    <V N="AdjustmentPeriodFlag" D="Adjustment Period Flag" T="0">N</V>
901A:   <V N="Description" D="Description" T="0" />
902A:   <V N="Context" D="Context" T="0" />
903A:   <V N="UserPeriodType" D="User Period Type" T="0">Weekly</V>
904A: </H>
905A: <H DP="4">
906A:   <T>2</T> <ID>17</ID> <PID>13</PID>
907A:   <HC>941916631</HC> <HD>4PeriodsVO</HD>
908A:   <S>PeriodSets</S> <N>PeriodsVO</N> <D>Periods</D>
909A:   <V N="PeriodName" D="Period Name" T="0">FEB-W1-05</V>
910A:   <V N="StartDate" D="Start Date" T="0">2005-01-24</V>
911A:   <V N="EndDate" D="End Date" T="0">2005-01-30</V>
912A:   <V N="PeriodYear" D="Period Year" T="0">2005</V>
913A:   <V N="PeriodNum" D="Period Num" T="0">5</V>
914A:   <V N="QuarterNum" D="Quarter Num" T="0">1</V>
915A:   <V N="EnteredPeriodName" D="Entered Period Name" T="0">FEB-W1</V>
916A:   <V N="AdjustmentPeriodFlag" D="Adjustment Period Flag" T="0">N</V>
917A:   <V N="Description" D="Description" T="0" />
918A:   <V N="Context" D="Context" T="0" />
919A:   <V N="UserPeriodType" D="User Period Type" T="0">Weekly</V>
920A: </H>
921A: </EXT>
```

| | 1021 | 1022 | 1023 | 1024 | 1025 | 1026 | 1027 / 1028 | 1029 | 1030 | 1031 |
|---|---|---|---|---|---|---|---|---|---|---|
| | Name | Display_Name | Request_Id | Source | Type | Id | Parent_Id | Hashcode_Details | Depth | Is_Transformed | ATTR_DIFF |
| 1051 | CalendarSetupAM | CalendarSetup | 123400 | PeriodSets | -1 | 1 | 0 | 1CalendarSetupAM | 1 | N | ... |
| 1052 | PeriodSetsVO | PeriodSets | 123400 | PeriodSets | 0 | 3 | 1 | 3PeriodSetsVOPeriodSetName JEBE_MONTH_VAT | 3 | N | ... |
| 1053 | PeriodSetsVO | PeriodSets | 123400 | PeriodSets | 0 | 13 | 1 | 3PeriodSetsVOPeriodSetName GL_CALENDAR | 3 | N | ... |
| 1054 | PeriodsVO | Periods | 123400 | PeriodSets | 2 | 5 | 3 | 4PeriodsVO | 4 | N | ... |
| 1055 | PeriodsVO | Periods | 123400 | PeriodSets | 2 | 7 | 3 | 4PeriodsVO | 4 | N | ... |
| 1056 | PeriodsVO | Periods | 123400 | PeriodSets | 2 | 9 | 3 | 4PeriodsVO | 4 | N | ... |
| 1057 | PeriodsVO | Periods | 123400 | PeriodSets | 2 | 11 | 3 | 4PeriodsVO | 4 | N | ... |
| 1058 | PeriodsVO | Periods | 123400 | PeriodSets | 2 | 15 | 13 | 4PeriodsVO | 4 | N | ... |
| 1059 | PeriodsVO | Periods | 123400 | PeriodSets | 2 | 17 | 13 | 4PeriodsVO | 4 | N | ... |

| | ATTR_DIFF |
|---|---|
| 1051 | <H></H> |
| 1052 | <H><V N='PeriodSetName' U='Y' D='Period Set Name' T='1'><A>JEBE_MONTH_VAT</A></V><V N='Description' D='Description' T='0'><A>Belgian Localisation Monthly VAT Calendar</A></V><V N='Context' D='Context' T='0'><A></A></V></H> |
| 1053 | <H><V N='PeriodSetName' U='Y' D='Period Set Name' T='1'><A>GL_CALENDAR</A></V><V N='Description' D='Description' T='0'><A>GL ACCOUNTING CALENDAR</A></V><V N='Context' D='Context' T='0'><A></A></V></H> |
| 1054 | <H><V N='PeriodName' D='Period Name' T='0'><A>JAN-2001</A></V><V N='StartDate' D='Start Date' T='0'><A>2001-01-01</A></V><V N='EndDate' D='End Date' T='0'><A>2001-01-31</A></V><V N='PeriodYear' D='Period Year' T='0'><A>2001</A></V><V N='PeriodNum' D='Period Num' T='0'><A>1</A></V><V N='QuarterNum' D='Quarter Num' T='0'><A>1</A></V><V N='EnteredPeriodName' D='Entered Period Name' T='0'><A>JAN</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Month</A></V></H> |
| 1055 | <H><V N='PeriodName' D='Period Name' T='0'><A>FEB-2001</A></V><V N='StartDate' D='Start Date' T='0'><A>2001-02-01</A></V><V N='EndDate' D='End Date' T='0'><A>2001-02-28</A></V><V N='PeriodYear' D='Period Year' T='0'><A>2001</A></V><V N='PeriodNum' D='Period Num' T='0'><A>2</A></V><V N='QuarterNum' D='Quarter Num' T='0'><A>1</A></V><V N='EnteredPeriodName' D='Entered Period Name' T='0'><A>FEB</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Month</A></V></H>" |
| 1056 | <H><V N='PeriodName' D='Period Name' T='0'><A>MAR-2001</A></V><V N='StartDate' D='Start Date' T='0'><A>2001-03-01</A></V><V N='EndDate' D='End Date' T='0'><A>2001-03-31</A></V><V N='PeriodYear' D='Period Year' T='0'><A>2001</A></V><V N='PeriodNum' D='Period Num' T='0'><A>3</A></V><V N='QuarterNum' D='Quarter Num' T='0'><A>1</A></V><V N='EnteredPeriodName' D='Entered Period Name' T='0'><A>MAR</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Month</A></V></H> |
| 1057 | <H><V N='PeriodName' D='Period Name' T='0'><A>APR-2001</A></V><V N='StartDate' D='Start Date' T='0'><A>2001-04-01</A></V><V N='EndDate' D='End Date' T='0'><A>2001-04-30</A></V><V N='PeriodYear' D='Period Year' T='0'><A>2001</A></V><V N='PeriodNum' D='Period Num' T='0'><A>4</A></V><V N='QuarterNum' D='Quarter Num' T='0'><A>2</A></V><V N='EnteredPeriodName' D='Entered Period Name' T='0'><A>APR</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Month</A></V></H> |
| 1058 | <H><V N='PeriodName' D='Period Name' T='0'><A>JAN-W4-05</A></V><V N='StartDate' D='Start Date' T='0'><A>2005-01-17</A></V><V N='EndDate' D='End Date' T='0'><A>2005-01-23</A></V><V N='PeriodYear' D='Period Year' T='0'><A>2005</A></V><V N='PeriodNum' D='Period Num' T='0'><A>4</A></V><V N='QuarterNum' D='Quarter Num' T='0'><A>1</A></V><V N='EnteredPeriodName' D='Entered Period Name' T='0'><A>JAN-W4</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Weekly</A></V></H> |
| 1059 | <H><V N='PeriodName' D='Period Name' T='0'><A>FEB-W1-05</A></V><V N='StartDate' D='Start Date' T='0'><A>2005-01-24</A></V><V N='EndDate' D='End Date' T='0'><A>2005-01-30</A></V><V N='PeriodYear' D='Period Year' T='0'><A>2005</A></V><V N='PeriodNum' D='Period Num' T='0'><A>5</A></V><V N='QuarterNum' D='Quarter Num' T='0'><A>1</A></V><V N='EnteredPeriodName' D='Entered Period Name' T='0'><A>FEB-W1</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Weekly</A></V></H> |

*FIG. 10B*

```
1171: SELECT extractvalue(VALUE(e),   '/V/@N') name,
1172:            extractvalue(VALUE(e),   '/V/A') attr_value_a,
1173:            extractvalue(VALUE(e),   '/V/B') attr_value_b,
1174:            d.id parent_id,
1175:            id,
1176:            'N' is_different,
1177:            decode(extractvalue(VALUE(e), '/V/A'),
1178:                   extractvalue(VALUE(e),'/V/B'),'NotTransformed','Transformed') attribute_transformed,
1179:            extractvalue(VALUE(e),   '/V/@D') display_name,
1180:            d.id relational_id,
1181:            extractvalue(VALUE(e),   '/V/B/text()') attr_value_old_b
1182: FROM     az_diff_results d,
1183:            TABLE (xmlsequence(EXTRACT(d.attr_diff,   '/H/V'))) e
1184: WHERE d.request_id = 123400 AND d.source = 'PeriodSets'
1185:            AND UPPER(hashcode_details) LIKE UPPER('%HashedPeriodSetName%')
```

*FIG. 11B*

| XML Editor | | | | |
|---|---|---|---|---|
| Details: Period Sets ← 1210 | | | | |
| Search | | | | |
| TIP search is conducted on the old values | | | | |
| Period Set Name [JEBE_MONTH_VAT] | | | | |
| ☑ Show transformed only | | | | |
| ☑ Show Possible Conflicts only | | | | |
| | | | | Go |
| | | Transform All | Cancel | Save | Apply |
| Name | Possible Conflict | Transformed | Extracted Value | Transformed Value |
| ⊟ Period Sets | | | | |
| Period Set Name | | | JEBE_MONTH_VAT | [My Own Calendar] |
| Description | | | Belgian Localisation Monthly VAT Calendar | Belgian Localisation Monthly VAT Calendar |
| Context | | | | |
| ⊞ Period Sets | | | | |
| | | | View Log | Freeze |

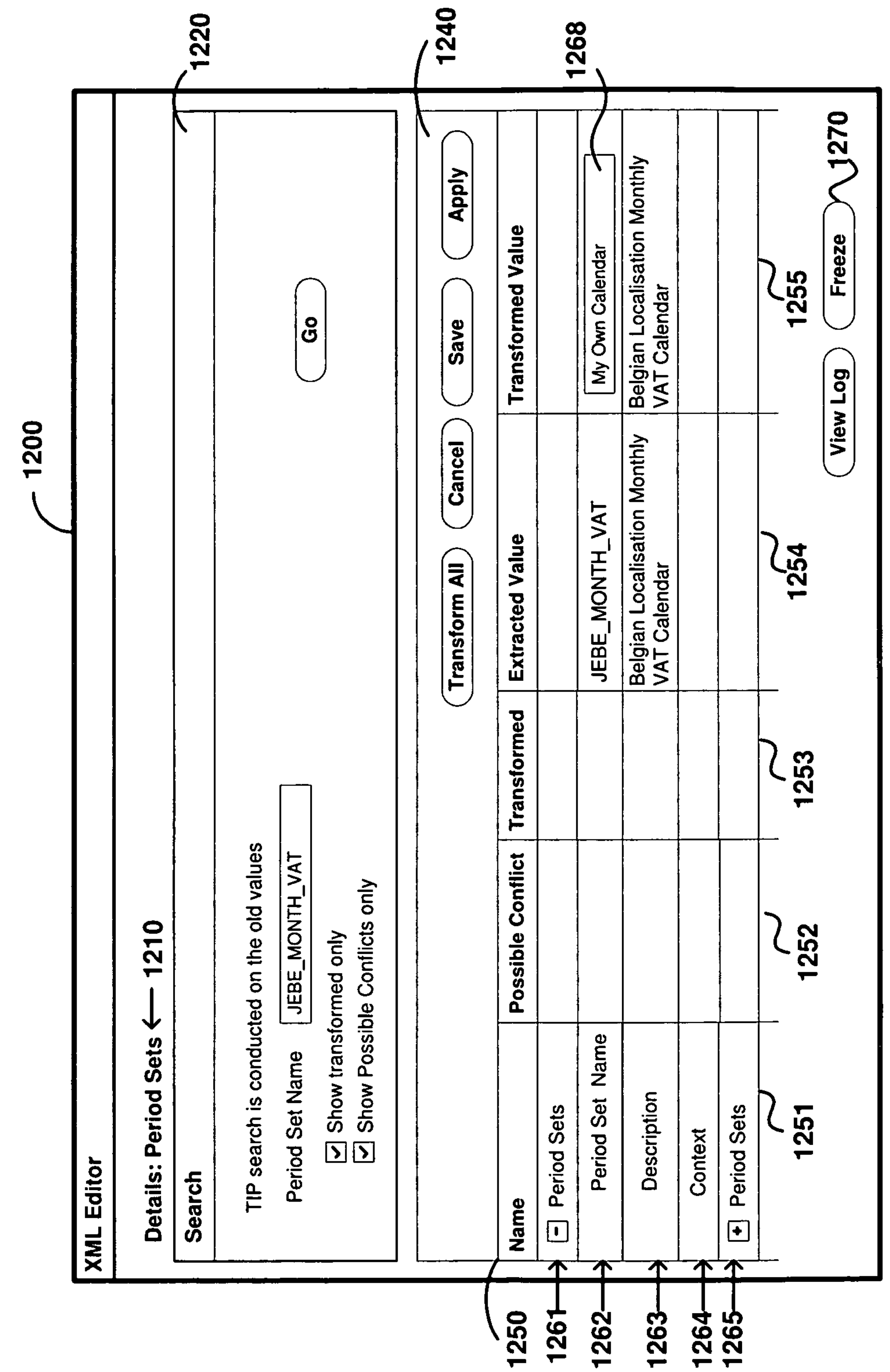

FIG. 12A

```
UPDATE az_diff_results e
SET e.attr_diff = (
        SELECT d.attr_diff.transform( xmltype('<?xml version="1.0" ?>
            <xsl:stylesheet version="1.0" xmlns:xsl="http://www.w3.org/1999/XSL/Transform">
                <xsl:template match="H">
                <H>
                    <xsl:for-each select="V">
                    <V>
                        <xsl:copy-of select="@*[not(name()="A2")]"/>
                        <xsl:choose>
                            <xsl:when test="@N="PeriodSetName"">
                                <xsl:attribute name="A2">Y</xsl:attribute>
                                <xsl:copy-of select="A"/>
                                <xsl:element name="B">My Own Calendar</xsl:element>
                            </xsl:when>
                            <xsl:otherwise>
                                <xsl:copy-of select="A"/>
                                <xsl:copy-of select="B"/>
                            </xsl:otherwise>
                        </xsl:choose>
                    </V>
                    </xsl:for-each>
                </H>
                </xsl:template>
            </xsl:stylesheet>') ).createSchemaBasedXml('http://www.acme.com/06/diffresultdata.xsd')
        FROM az_diff_results d
        WHERE d.request_id = 123400 AND d.source = 'PeriodSets' AND  d.id = 3)
WHERE e.request_id = 123400 AND e.source = 'PeriodSets' AND  e.id =3;
```

| | ATTR_DIFF |
|---|---|
| 1251 | <H></H> |
| 1252 | **<H><V N='PeriodSetName' U='Y' D='Period Set Name' T='1' A2='Y'><A>JEBE_MONTH_VAT</A><B>My Own Calendar</B></V><V N='Description' D='Description' T='0'><A>Belgian Localisation Monthly VAT Calendar</A></V><V N='Context' D='Context' T='0'><A></A></V></H>** |
| 1253 | <H><V N='PeriodSetName' U='Y' D='Period Set Name' T='1'><A>GL_CALENDAR</A></V><V N='Description' D='Description' T='0'><A>GL ACCOUNTING CALENDAR</A></V><V N='Context' D='Context' T='0'><A></A></V></H> |
| 1254 | <H><V N='PeriodName' D='Period Name' T='0'><A>JAN-2001</A></V><V N='StartDate' D='Start Date' T='0'><A>2001-01-01</A></V><V N='EndDate' D='End Date' T='0'><A>2001-01-31</A></V><V N='PeriodYear' D='Period Year' T='0'><A>2001</A></V><V N='PeriodNum' D='Period Num' T='0'><A>1</A></V><V N='QuarterNum' D='Quarter Num' T='0'><A>1</A></V><V N='EnteredPeriodName' D='Entered Period Name' T='0'><A>JAN</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Month</A></V></H> |
| 1255 | <H><V N='PeriodName' D='Period Name' T='0'><A>FEB-2001</A></V><V N='StartDate' D='Start Date' T='0'><A>2001-02-01</A></V><V N='EndDate' D='End Date' T='0'><A>2001-02-28</A></V><V N='PeriodYear' D='Period Year' T='0'><A>2001</A></V><V N='PeriodNum' D='Period Num' T='0'><A>2</A></V><V N='QuarterNum' D='Quarter Num' T='0'><A>1</A></V><V N='EnteredPeriodName' D='Entered Period Name' T='0'><A>FEB</A></V><V N='AdjustmentPeriodFlag' D='Adjustment Period Flag' T='0'><A>N</A></V><V N='Description' D='Description' T='0'><A></A></V><V N='Context' D='Context' T='0'><A></A></V><V N='UserPeriodType' D='User Period Type' T='0'><A>Month</A></V></H>" |

*FIG. 12C*

```
1311: SELECT  d.name, d.id, d.parent_id,
1312:         d.attr_diff.transform(xmltype('<?xml version="1.0" ?>
1313:             <xsl:stylesheet version="1.0" xmlns:xsl="http://www.w3.org/1999/XSL/Transform">
1314:                 <xsl:template match="H">
1315:                     <xsl:for-each select="V">
1316:                         <xsl:element name="{@N}">
1317:                             <xsl:value-of select="./B"/>
1318:                         </xsl:element>
1317:                     </xsl:for-each>
1318:                 </xsl:template>
1319:             </xsl:stylesheet>')).getclobval() AS sub
1320: FROM    az_diff_results d
1321: WHERE   d.request_id=123400 AND d.source='PeriodSets'
1322: ORDER BY d.id
```

*FIG. 13A*

| | Name (1331) | Id (1332) | Parent_Id (1333) | SUB (1334) |
|---|---|---|---|---|
| 1341 | CalendarSetupAM | 1 | 0 | |
| 1342 | PeriodSetsVO | 3 | 1 | <PeriodSetName>My Own Calendar</PeriodSetName><Description>Belgian Localisation Monthly VAT Calendar</Description><Context></Context> |
| 1343 | PeriodsVO | 5 | 3 | <PeriodName>JAN-2001</PeriodName> <StartDate>2001-01-01</StartDate> <EndDate>2001-01-31</EndDate> <PeriodYear>2001</PeriodYear> <PeriodNum>1</PeriodNum> <QuarterNum>1</QuarterNum> <EnteredPeriodName>JAN</EnteredPeriodName> <AdjustmentPeriodFlag>N</AdjustmentPeriodFlag> <Description /> <Context /> <UserPeriodType>Month</UserPeriodType> |
| 1344 | PeriodsVO | 7 | 3 | <PeriodName>FEB-2001</PeriodName> <StartDate>2001-02-01</StartDate> <EndDate>2001-02-28</EndDate> <PeriodYear>2001</PeriodYear> <PeriodNum>2</PeriodNum> <QuarterNum>1</QuarterNum> <EnteredPeriodName>FEB</EnteredPeriodName> <AdjustmentPeriodFlag>N</AdjustmentPeriodFlag> <Description /> <Context /> <UserPeriodType>Month</UserPeriodType> |

*FIG. 13B*

```
1361: <?xml version="1.0" encoding="UTF-8" ?>
1362: <CalendarSetupAM ID="BE" MIN_API_VERSION="120.5">
1363: <PeriodSetsVO ID="VIEW">
1364:   <PeriodSetsVO>
1365:       <PeriodSetName>My Own Calendar</PeriodSetName>
1366:       <Description>Belgian Localisation Monthly VAT Calendar</Description>
1367:       <Context />
1368:       <PeriodsVO>
1369:           <PeriodName>JAN-2001</PeriodName>
1370:           <StartDate>2001-01-01</StartDate>
1371:           <EndDate>2001-01-31</EndDate>
1372:           <PeriodYear>2001</PeriodYear>
1373:           <PeriodNum>1</PeriodNum>
1374:           <QuarterNum>1</QuarterNum>
1375:           <EnteredPeriodName>JAN</EnteredPeriodName>
1376:           <AdjustmentPeriodFlag>N</AdjustmentPeriodFlag>
1377:           <Description />
1378:           <Context />
1379:           <UserPeriodType>Month</UserPeriodType>
1380:       </PeriodsVO>
1381:       ......................................
1382:       ......................................
```

*FIG. 13C*

ENABLING USERS TO EDIT VERY LARGE XML DATA

BACKGROUND

1. Technical Field

The present disclosure relates to data processing and more specifically to enabling users to edit very large XML data.

2. Related Art

XML (eXtensible Markup Language) refers to a language/specification used for describing information/data. XML enables users to specify desired characteristics of the data being described in the form of associated elements (typically containing corresponding start and end tags) and/or attributes. Thus, XML data generally contains elements (or attributes) set equal to corresponding desired data values to describe the data.

The user may specify any desired elements and attributes (and combination thereof) for describing the data. Such a feature is in sharp contrast to other markup languages such as HTML (hypertext markup language), where the elements/attributes are generally pre-defined, and a user is enabled only to associate the data being described with the desired pre-defined elements/attributes.

There is often a need to edit XML data, for example, to make a desired change to a portion of pre-existing XML data. At least due to factors such as flexible element/attribute names, absence of set limits on the number of levels of (hierarchical) indention, the amount of data that may be associated with individual elements/attributes, challenges are presented in providing a suitable interface by which a user can edit XML data.

The challenges are compounded as the size of the XML data becomes very large.

BRIEF DESCRIPTION OF THE DRAWINGS

Example embodiments of the present invention are described with reference to the accompanying drawings briefly described below.

FIGS. 7A-7C together depicts a sample portion of a very large XML data to be edited in one embodiment.

FIG. 8A depicts a portion of a metadata specifying the keys on which a very large XML data can be searched in one embodiment.

FIG. 8B depicts a portion of a metadata specifying the elements/attributes of a very large XML data that can be edited in one embodiment.

FIGS. 9A-9D depicts a portion of a generic XML data generated corresponding to a very large XML data in one embodiment.

FIGS. 10A and 10B together depicts a portion of a tabular data corresponding to a very large XML data in one embodiment.

FIG. 11B depicts a search query generated corresponding to a search request received from a user for searching desired portions of a very large XML data in one embodiment.

FIG. 12A depicts a user interface enabling users to edit a very large XML data in one embodiment.

FIG. 12B depicts a query generated corresponding to a request for editing a portion of a very large XML data in one embodiment.

FIG. 12C depicts a portion of the tabular data indicating the manner in which update of a new value corresponding to an element is performed in one embodiment.

FIG. 13A depicts a query performed in response to receiving an indication to construct a new very large XML data containing the edits/changes performed by users in one embodiment.

FIG. 13B depicts a portion of the result of performance of a query designed to construct a new very large XML data containing the edits/changes performed by users in one embodiment.

FIG. 13C depicts a portion of a new very large XML data constructed from a corresponding tabular data containing the edits/changes performed by users in one embodiment.

In the drawings, like reference numbers generally indicate identical, functionally similar, and/or structurally similar elements. The drawing in which an element first appears is indicated by the leftmost digit(s) in the corresponding reference number.

DESCRIPTION OF EXAMPLE EMBODIMENTS

1. Overview

Figure 1:
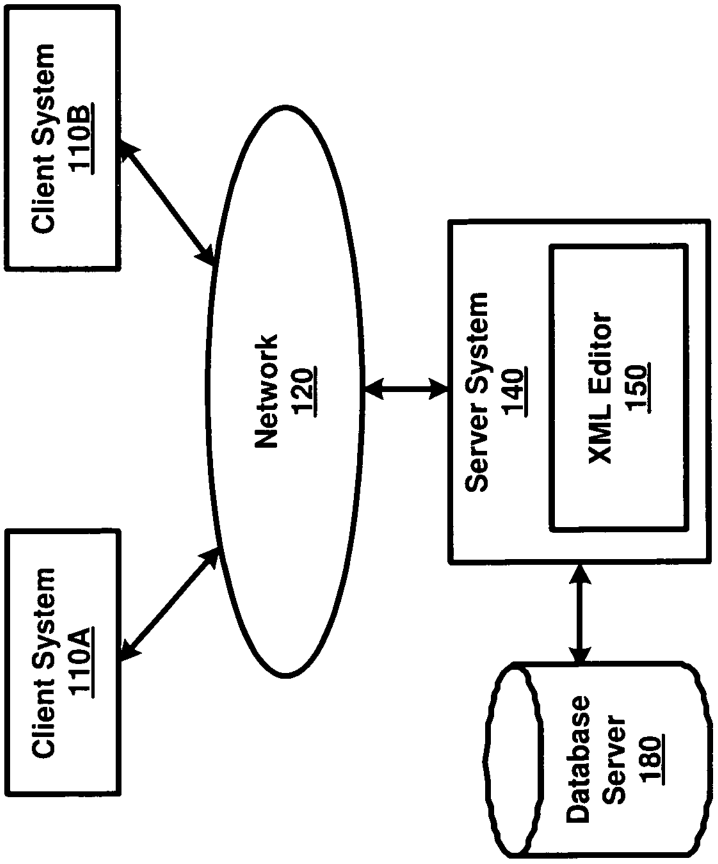
FIG. 1 is a block diagram illustrating an example environment (computing system) in which several aspects of the present invention can be implemented.

An aspect of the present invention enables users to edit data encoded in extended markup language (XML). In one embodiment, an XML data to be edited is received and preprocessed to generate a tabular data corresponding to the XML data. The generated tabular data is then stored in the form of a staging table in a database.

On receiving a request indicating that a portion of the XML data is to be replaced by a new portion, a query corresponding to the request is generated. The query is directed to the staging table in the database and is designed to cause the portion to be replaced by the new portion in the tabular data. The query is then performed on the database to replace the portion with the new portion in the tabular data.

Further requests are processed similarly and the tabular data is modified according to the requests. On receiving an indication that the editing of the XML data is complete, a new XML data is constructed from the tabular data stored in the staging table in the database. The new XML data constructed contains the corresponding new portions in place of the corresponding portions as indicated by the requests.

Another aspect of the present invention enables the above requests to be received from different users, thereby enabling multiple users to edit the same XML data.

According to one more aspect of the present invention, preprocessing entails first converting the received XML data to a generic XML data and then creating the tabular data based on the generic XML data. The generic XML data is based on the same (generic) schema for different XML data (sought to be edited) for different user defined schemas. By using the generic XML schema, the logic for implementation of editing may be simplified when editing different XML data.

Yet another aspect of the present invention enables users to search for desired portions of an XML data. In one embodiment, on receiving a search request specifying criteria for finding the desired portions of an XML data, a search query corresponding to the search request is generated. The search query is directed to a staging table in the database, with the staging table storing the tabular data generated by preprocessing the XML data.

The search query is performed on the tabular data stored in the staging table and a set of portions of the XML data matching the criteria is identified. The identified set of portions is then sent as a response to the search request.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, with other methods, or combining one more aspects/features described herein, etc. In other instances, well-known structures or operations are not shown in detail to avoid obscuring the features of the invention.

2. Example Environment

FIG. 1 is a block diagram illustrating an example environment (computing system) in which several aspects of the present invention can be implemented. The block diagram is shown containing client systems 110A-110B, network 120, server system 140 (containing XML editor 150), and database server 180.

Merely for illustration, only representative number/type of systems is shown in the Figure. Many environments often contain many more systems, both in number and type, depending on the purpose for which the environment is designed. Each block of FIG. 1 is described below in further detail.

Network 120 provides connectivity between various client systems 110A-110B and server system 140. Network 120 may be implemented using protocols such as Internet Protocol (IP) well known in the relevant arts. In general, in IP environments, an IP packet is used as a basic unit of transport, with the source address being set to the IP address assigned to the source system from which the packet originates and the destination address set to the IP address of the target system to which the packet is to be eventually delivered.

Database server 180 facilitates storage and retrieval of a collection of data. Database server 180 may be used to maintain any data/information which facilitates users to edit very large XML data, for example, the tabular data generated by preprocessing a very large XML data according to an aspect of the present invention, as described in sections below.

In one embodiment, database server 180 is implemented using relational database technologies and therefore provides storage and retrieval of data using structured queries such as SQL (Structured Query Language). SQL refers to a special-purpose, nonprocedural language that supports the definition, manipulation, and control of data in systems implementing relational database technologies.

Each of client systems 110A-110B represents a system such as a personal computer, workstation, mobile station, etc., used by an end user to generate (client) requests to applications (such as XML editor 150) executing in server system 140 and to receive corresponding responses. A client request may correspond to a request for sending a very large XML data to be edited, a request for editing the very large XML data sent earlier, an indication to indicate completion of editing, etc.

The requests/responses may be generated/viewed using appropriate user interfaces provided by the applications executing in server system 140 and/or local applications executing in the runtime environment of client systems 110A-110B. The user interfaces may be displayed on a display unit (not shown in FIG. 1) associated with each of the client systems 110-110B.

Server system 140 represents a server, such as a web/application server, which executes applications such as XML editor 150. Server system 140 may also contain other software programs such as operating system, device drivers, etc., (not shown) that provides a runtime environment facilitating the execution of applications such as XML editor 150.

XML editor 150 represents a software program capable of performing specific client requests received from users using one of client systems 110A-110B. In particular, XML editor 150 is designed to receive client requests for editing a (very large) XML data, process the client requests and send the results of processing as corresponding responses to the requesting client system.

In one prior approach termed DOM (Document Object Model), the XML data to be edited is viewed as a tree of objects that can be programmatically accessed and updated. On receiving an XML data, the corresponding tree/DOM representation is created in volatile memory (RAM) of the server system. Client requests specifying XPath (XML Path) expressions for accessing desired portions of the XML data are then received, processed based on the DOM and the results of processing are sent as corresponding responses.

Such an approach requires that a tree/DOM representation for the complete XML data (or a substantial portion thereof) be created in volatile memory prior to accepting requests for editing the XML data. As such, substantially large amounts of volatile memory may be required for processing very large XML data. Further, it may be desirable that multiple/different users be allowed to edit the same XML data simultaneously (generally not allowed by the DOM approach).

XML editor 150 provided according to several aspects of the present invention enables users to edit very large XML data while overcoming at least some of the above-described shortcomings as described below with examples.

3. Enabling Editing of a Very Large XML Data

Figure 2:
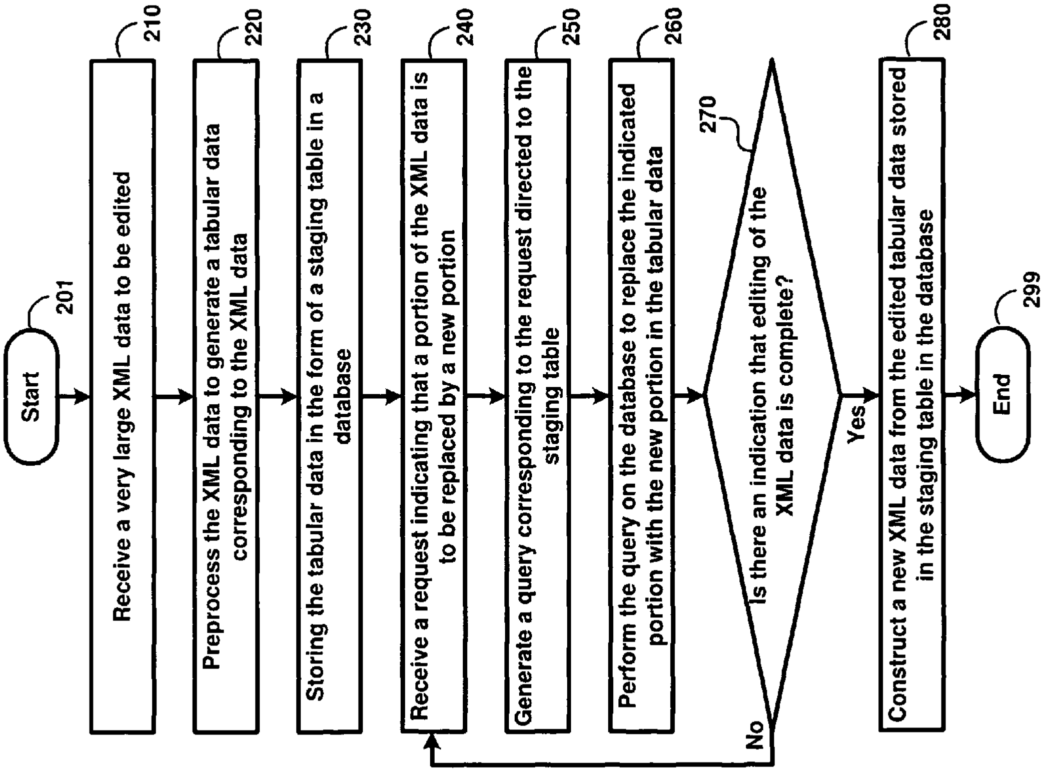
FIG. 2 is a flowchart illustrating the manner in which users are enabled to edit very large XML data according to an aspect of the present invention.

FIG. 2 is a flowchart illustrating the manner in which users are enabled to edit very large XML data according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 201, in which control immediately passes to step 210.

In step 210, XML editor 150 receives a very large XML data to be edited. The XML data may be received from a user using one of client systems 110A-110B. In one embodiment, the XML data is received in the form of an XML document/file containing the data to be edited.

Alternatively, XML editor 150 may receive an identifier (or multiple identifiers) identifying a set (one or more) of XML documents/files containing the data to be edited. XML editor 150 may then retrieve (and form) the very large XML data from a non-volatile memory (such as a hard disk in server system 140 or in external systems, not shown) storing the set of XML documents/files as indicated by received identifier(s).

As described in the background section, the received/formed very large XML data may contain any desired user specified set of elements/attributes (generally referred to as a schema), with the XML data being provided as values associated with any combination of the user specified elements and/or attributes.

In step 220, XML editor 150 preprocesses the XML data to generate a tabular data corresponding to the XML data. Preprocessing may involve first converting the received XML data to a generic XML data and then creating the tabular data based on the generic XML data. A generic XML data is characterized by a common set of elements to which the elements/attributes of the received XML data can be mapped.

Such mapping can be performed irrespective of the respective schema (defining elements/attributes and relationships) being used for the XML data sought to be edited. By performing such mapping, the same program logic can be used to process the (pairs of) XML data of different schemas, as will be apparent to a skilled practitioner. However, alternative embodiments can be implemented without using such preprocessing. An example of such preprocessing is described below with respect to FIG. 3.

In step 230, XML editor 150 stores the tabular data in the form of a table (hereafter referred to as a staging table) in a database. The database may correspond to a database provided local to server system 140 or provided in database server 180. The storage of the tabular data in a database facilitates the editing of the XML data to be provided using structured queries such as SQL in case of relational databases and SQL XPATH queries incase of XML databases.

Further, the storage in a database enables a very large quantity of XML data to be processed by multiple users simultaneously, while ensuring that only a small amount of volatile memory be required for processing the XML data.

In step 240, XML editor 150 receives a request indicating that a portion of the XML data is to be replaced by a new portion. The request may be received from a user using one of client systems 110A-110B. The user may be the same user for whom the XML data was received (in step 210) or may be a different user.

The request may be generated by the user by using any appropriate interface. In one embodiment, XML editor 150 is designed to provide a suitable interface for users to indicate the specific ones of the user specified elements/attributes (the corresponding value representing the portion of the XML data to be replaced) and the corresponding new values (representing the new portion with which the indicated portion is to be replaced) as described below with respect to FIG. 5.

In step 250, XML editor 150 generates a query corresponding to the request directed to the staging table. The query is designed to replace the indicated portion with the new portion in the tabular data stored in the staging table.

In one embodiment, where the database containing the staging table is stored in database server 180 (implemented using relational database technologies), the query is generated in SQL as described below with examples. Alternatively, the query may be generated in any suitable/convenient format as required by the system storing the database containing the staging table.

In step 260, XML editor 150 performs the query on the database to replace the indicated portion with the new portion in the tabular data. In the above embodiment, the performance of the query ensures that the old values of the specific ones of the user specified elements/attributes indicated in the request are replaced by the corresponding new values specified in the request.

The query may be performed on the database in a known way. In the above embodiment when database server 180 is implemented using relational database technologies, the performance of the query may entail first sending a command (containing a username and a password for authentication) for creating a connection with the database, receiving an indication indicating a successful connection, sending the query for execution to the database, and receiving a confirmation of successful execution of the query.

Though not shown, it may be appreciated that XML editor 150 may send a response indicating the status (success or failure) of the request for editing the XML data to the requesting client system. The response may also indicate other information such as the reasons for failure to edit the XML data, the number of elements/attributes successfully replaced/edited etc.

In step 270, XML editor 150 determines whether an indication that editing of the XML data is complete exists. The indication may be received from users using one of client systems 110A-110B. Control passes to step 280 if an indication exists (is received) and to step 240 otherwise.

It may be appreciated that in step 240, XML editor 150 may receive a second request indicating that a second portion of the XML data is to be replaced with another new portion. The second request may be received from the same user or a different user. XML editor 150 may then process the second request (and other future requests) similarly to the request as described above. Thus, by passing control to step 240, the user may conveniently request editing of different portions as corresponding requests.

In step 280, XML editor 150 constructs a new XML data from the edited tabular data stored in the staging table in the database. The new XML data is constructed from the edited tabular data thereby ensuring that all the edited portions of the XML data are incorporated into the new XML data.

In one embodiment, the construction of the new XML data is performed using a SQL query directed to the staging table. The SQL query on execution retrieves the edited tabular data from the staging table in a manner that facilitates generation of a corresponding XML data. The flow chart ends in step 299.

It may be observed that the new XML data constructed contains the new portions in place of the corresponding indicated portions as indicated by the requests sent by the same/different users. Further, the construction of the new XML data is performed in response to the indication indicating that the editing of the XML data is complete. Thus, various users may edit/modify the same XML data (simultaneously) and then construct a new XML data containing all the modifications performed by the various users.

Thus, users are enabled to edit a very large XML data. It may be appreciated that the ability to edit (simultaneously) a very large XML data by the same/different users is facilitated by the generation and storage of the corresponding tabular data in a database. Accordingly, the manner in which a very large XML data is preprocessed to generate a corresponding tabular data is described below with examples.

4. Preprocessing a Very Large XML Data

Figure 3:
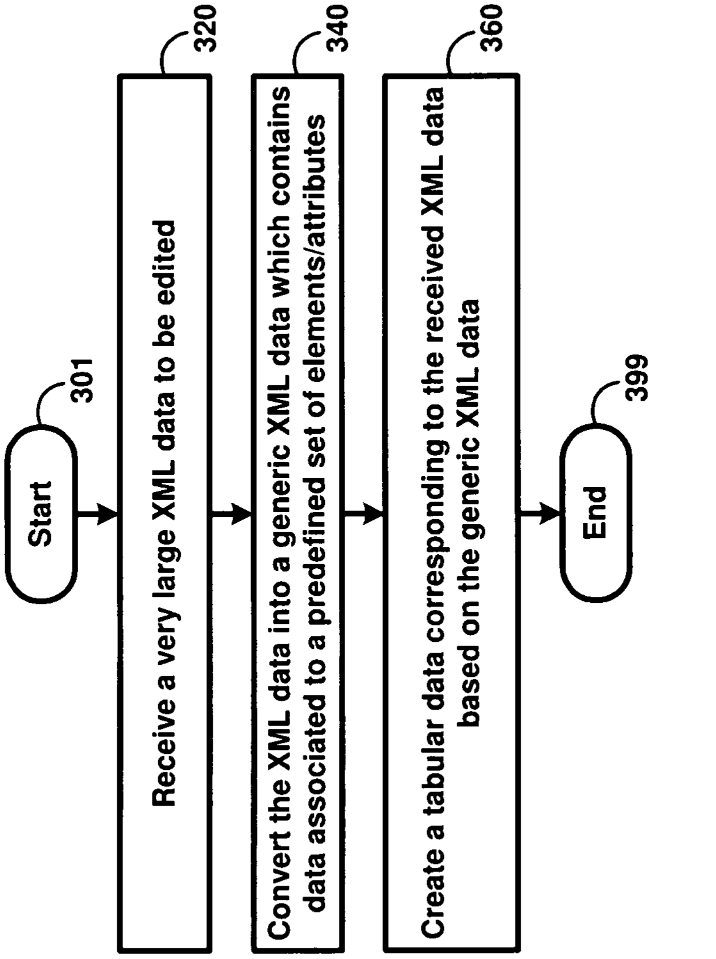
FIG. 3 is a flowchart illustrating the manner in which a very large XML data is preprocessed and a corresponding tabular data is generated according to an aspect of the present invention.

FIG. 3 is a flowchart illustrating the manner in which a very large XML data is preprocessed and a corresponding tabular data is generated according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 301, in which control immediately passes to step 320.

In step 320, XML editor 150 receives a very large XML data to be edited. The XML data (containing data associated with a user specified set of elements/attributes) may be received similar to the manner described in step 210 of FIG. 2 and therefore the description is not repeated for conciseness.

In step 340, XML editor 150 converts the XML data into a generic XML data which contains data associated to a predefined set of elements/attributes (as specified by XML editor 150). The generic XML data is generated according to a common set of elements/attributes (in contrast to user specified set of elements/attributes used in the XML data), implying that all (or many) very large XML data sets are converted using the same common set of elements and attributes to generate corresponding generic XML data. Such conversion to a common form simplifies creation of tabular data, as will be clear from the description below.

The conversion of the XML data to the generic XML data may be done similar to transforming XMLs from one format to another, for example, by using an appropriate set of XSL (XML Style Language) instructions. In one embodiment, the received XML data is first processed using a SAX (Simple API for XML) parser which provides an event-based interface by reading/processing the XML data in a sequential manner (in sharp contrast to DOM approach where a tree representation of the complete XML data is required to be created in volatile memory).

The SAX parser may generate events corresponding to finding a start tag of an element, an end tag of an element, the text contained in the data, etc. Events received from the SAX parser are processed (using data structures such as a stack for keeping track of the elements etc.) and the names and values corresponding to the various user specified elements/attributes are determined.

The determined names and values and other associated information such as the depth (hierarchical position) of the element, a flag indicating whether the element is a top-level element or not etc. are then appropriately encoded using the predefined set of elements/attributes. The processing of the events is continued until all of the XML data is processed by the SAX parser.

Thus, the received very large XML data is converted to the generic XML data containing information/data represented using a predefined set of elements/attributes.

In step 360, XML editor 150 creates a tabular data corresponding to the received XML data based on the generic XML data. The tabular data refers to information/data represented in the form of a table having a corresponding set of rows and columns (generally predefined).

Accordingly, the creation of the tabular data from the generic XML data may entail identifying portions of the generic XML data corresponding to elements in the received XML data, associating the identified portions to the corresponding elements, etc. The flow chart ends in step 399.

Thus, a very large XML data is preprocessed and the tabular data corresponding to the XML data is created. It may be appreciated that the tabular data thus created may be stored in the form of a staging table in a database as described above with respect to step 230 of FIG. 2. XML editor 150 may then receive requests to edit portions of the XML data and process the received requests using the tabular data stored in the staging table according to the steps of FIG. 2 (as described above).

Since the XML data is very large, it may be desirable that users be provided a convenient way of indicating the portions of the very large XML data that are to be edited. An aspect of the present invention enables users to search for desired portions of a very large XML data based on a user specified criteria as described below with examples.

5. Searching in a Very Large XML Data

Figure 4:
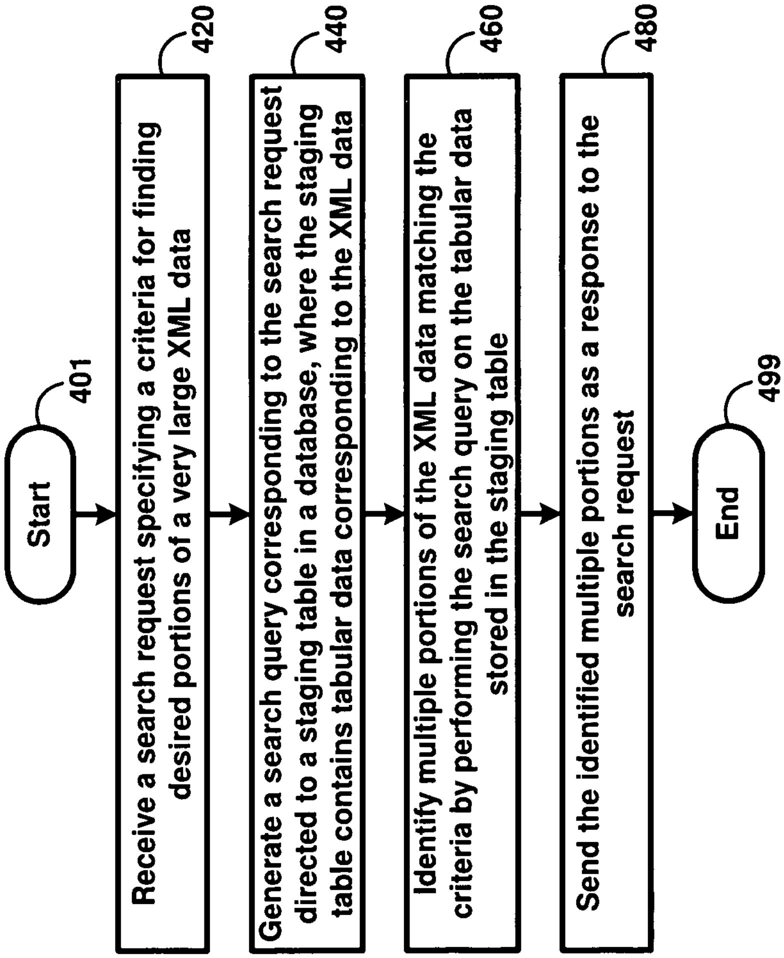
FIG. 4 is a flowchart illustrating the manner in which the searching for desired portions in a very large XML data is provided according to an aspect of the present invention.

FIG. 4 is a flowchart illustrating the manner in which the searching for desired portions in a very large XML data is provided according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention. The flow chart begins in step 401, in which control immediately passes to step 420.

In step 420, XML editor 150 receives a search request specifying a criteria for finding desired portions of a very large XML data. The search request may be received from users using one of client systems 110A-110B. The criteria may be specified in any desired/convenient manner. In one embodiment, a criteria is specified as a desired set of elements/attributes and a corresponding set of values to be matched.

In step 440, XML editor 150 generates a search query corresponding to the search request directed to a staging table in a database, where the staging table contains the tabular data corresponding to the XML data. The tabular data stored in the staging table may be generated by preprocessing the XML data (received prior to or along with the search request) as described above with respect to FIG. 3.

The search query may be generated in a known way. In particular, the search query needs to be generated in a manner designed to find the portions in the tabular data which correspond to the desired portions of the XML data as indicated by the criteria. In one embodiment, where the database containing the staging table is stored in database server 180 (implemented using relational database technologies) the search query is generated in SQL as described below with examples.

In step 460, XML editor 150 identifies multiple portions of the XML data matching the criteria by performing the search query on the tabular data stored in the staging table. As described above with respect step 260 of FIG. 2, the search query may be performed similar to the query corresponding to the request for editing the XML data and therefore the description is not repeated for conciseness.

On performance of the search query, the matching portions of the tabular data are first determined. In one embodiment, a portion of the tabular data is determined to be matching the criteria only if the value of each of the desired set of elements/attributes is similar (meaning having the same relationship as that specified in the criteria) to the corresponding value specified in the criteria. The multiple portions of the XML data corresponding to the matching portions of the tabular data are then identified or generated from the tabular data.

Though matching is performed for similarity between values, it may be appreciated that in alternative embodiments, other types of matching of the values such as a partial match, a wild card match, etc. may also be indicated in the criteria and correspondingly performed by XML editor 150.

In step 480, XML editor 150 sends the identified multiple portions as a response to the search request. The identified multiple portions of the XML data may be sent to a specific one of client systems 110A-110B (from which the search request originated). The response may be sent in a format suitable for display, thereby facilitating users to view the identified multiple portions on a display unit associated with the requesting client system. The flow chart ends in step 499.

Thus, users are enabled to search for different criteria and find corresponding matching portions of the XML data matching each criteria. After receiving the matching portions of a criteria, users may send requests for editing one or more of the received matching portions. XML editor 150 may receive and process such requests similar to the manner described in FIG. 2.

It may be appreciated that a user may desire to send multiple search requests to XML editor 150 and then send further requests for editing portions matching the criteria specified in the search requests. The search requests and the requests for editing may be sent in any desired/convenient combination.

Thus, it may be desirable that the user be provided a common interface to search for and edit desired portions of a very large XML data. Accordingly, the manner in which a common interface for searching and editing very large XML data is provided is described below with examples.

6. Providing a Common Interface

Figure 5:
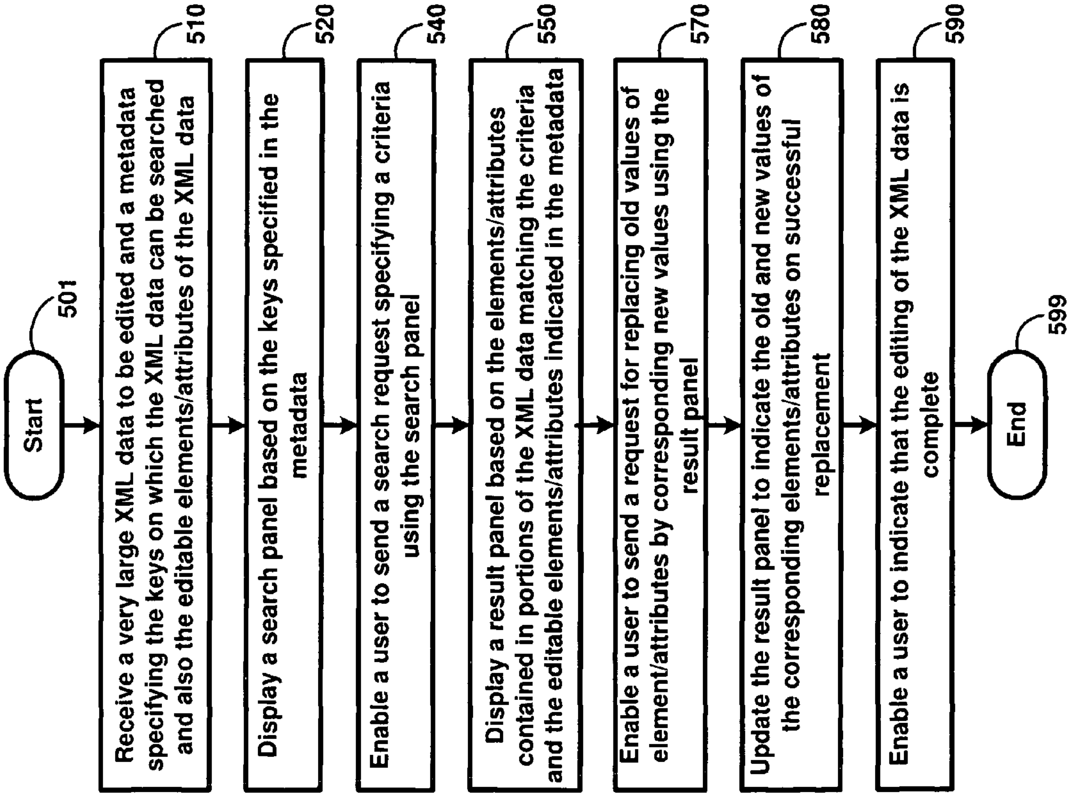
FIG. 5 is a flowchart illustrating the manner in which a common interface for searching and editing desired portions of a very large XML data is provided according to an aspect of the present invention.

FIG. 5 is a flowchart illustrating the manner in which a common interface for searching and editing desired portions of a very large XML data is provided according to an aspect of the present invention. The flowchart is described with respect to FIG. 1 merely for illustration. However, various features can be implemented in other environments also without departing from the scope and spirit of various aspects of the present invention, as will be apparent to one skilled in the relevant arts by reading the disclosure provided herein.

In addition, some of the steps may be performed in a different sequence than that depicted below, as suited in the specific environment, as will be apparent to one skilled in the relevant arts. Many of such implementations are contemplated to be covered by several aspects of the present invention.

It may be appreciated that the below described steps may be performed by XML editor 150 or by a local application (not shown) such as a browser executing in client systems 110A-110B. The local application may be designed to communicate (i.e., send requests and receive corresponding responses) with XML editor 150 to provide various aspects of the present invention as will be apparent to one skilled in the relevant arts by reading the disclosure provided herein.

Further, the common interface may be provided on a display unit (not shown) associated with one of client systems 110A-110B or server system 140. The flow chart begins in step 501, in which control immediately passes to step 510.

In step 510, a very large XML data to be edited and a metadata specifying the keys on which the XML data can be searched and also the editable elements/attributes of the XML data are received. The XML data (containing data associated with a user specified set of elements/attributes) may be received similar to the manner described in step 210 of FIG. 2 and therefore the description is not repeated for conciseness.

The metadata may be similarly provided by users using one of client systems 110A-110B along with or separately from the XML data. In one embodiment described below, the metadata is provided in the form of two properties file—one specifying the keys and the other specifying the editable elements/attributes. It may be appreciated that the below described steps may be performed (with suitable modifications) even without the existence (or receiving) of the metadata.

Any combination of elements and/or attributes may be specified as keys. Generally, keys are chosen such that they provide a unique identifier for relevant portions (in one embodiment, business entities) contained in the received XML data. For example an element corresponding to an employee identifier may be chosen as a key in a scenario that the XML data contains "Employee" elements.

Keys facilitate users to speedily search for the desired/relevant portions of the XML data. Accordingly, steps 340 and 360 may be suitably modified to generate tabular data based on the keys. In one embodiment, the hash code and the hash details corresponding to the relevant portions of the XML are generated based on the corresponding values of the keys specified in the metadata, thereby facilitating the search based on key value to be performed in a speedier manner.

In step 520, a search panel is displayed based on the keys specified in the metadata. The search panel may be generated based on the names of the elements/attributes specified in the metadata and then displayed on the display unit. In a scenario that the metadata is not received (or does not exist), a pre-defined search panel may be rendered which may enable users to specify any desired combination of user specified elements and/or attributes for identifying desired portions of the XML data.

In step 540, a user is enabled to send a search request specifying a criteria using the search panel. The search panel may be provided with fields associated with corresponding names of the elements/attributes specified in the metadata. The search panel may also provide a link/button for indicating sending of the search request.

A user may specify values in the fields associated with the elements/attributes desired to be matched and then click/select the link/button to send the specified values and the associated identifiers/names of the elements/attributes in the form of a criteria contained in a search request. On receiving such a search request, XML editor 150 may process the search request similar to the steps described in FIG. 4 (and therefore the description is not repeated for conciseness) to identify portions of the XML data matching the criteria. The identified/matching portions may be received as a response to the search request.

In step 550, a result panel is displayed based on the elements/attributes contained in portions of the XML data matching the criteria and the metadata. The elements/attributes contained in the matching portions of the XML data (as indicated by the response to the search request) may be displayed on the display unit in any convenient manner.

Each element/attribute displayed is further indicated to be editable or non-editable based on the information contained in the metadata. An element/attribute is determined to be editable if the corresponding name of the element/attribute is included in the names of the specific ones of the elements/attributes specified by the metadata.

In one embodiment, elements/attributes indicated to be editable according to the metadata are displayed associated with corresponding fields, while elements/attributes indicated to be non-editable are merely displayed.

In step 570, a user is enabled to send a request for replacing old values of elements/attributes by corresponding new values using the result panel. As described above, the result panel may display editable elements/attributes associated with corresponding fields. The result panel may also provide another link/button for indicating sending of the request for editing the XML data.

A user may specify the new values in the fields associated with the elements/attributes desired to be edited and then click/select another link/button to send the specified new values and the associated identifiers/names of the elements/attributes in the form of a request. It may be appreciated that the old values corresponding to the elements/attributes desired to be edited corresponding to the portion of the XML data which is to replaced by a corresponding new portion (represented by the new values corresponding to the elements/attributes desired to be edited)

On receiving such a request, XML editor 150 may process the request similar to the steps 250 and 260 described with respect to FIG. 2 (and therefore the description is not repeated for conciseness) thereby replacing the portion indicated in the request (the old values of the elements/attributes) by the corresponding new portion (the new values of the elements/attributes). XML editor 150 may then send a response indicating the status (success/failure) of the request for editing the XML data.

In step 580, the result panel is updated to indicate the old and new values of the corresponding elements/attributes on successful replacement. Displaying both the old and new values (simultaneously) of corresponding elements/attributes on a display enables users to compare the values as well as to quickly determine whether the desired new values have been replaced in the XML data.

Though not shown, it may be appreciated that in a scenario that the response indicates a failure of the request, the result panel may be updated in a suitable manner to display information such as the reasons for failure, the specific elements/attributes whose old values have not been replaced etc.

In step 590, a user is enabled to indicate that the editing of the XML data is complete. As described above, a third link/button may be provided to enable users to indicate completion of editing of the XML data. As such, a user may click/select the third link/button to indicate completion.

In response, XML editor 150 may construct a new XML data with the modifications/replacements performed by the users as described above with respect to step 280 of FIG. 2. The flow chart ends in step 599.

Thus, a common interface (containing the search and result panels) for searching and editing a very larger XML data is provided to the same/different users. The description is continued illustrating the manner in which users are enabled to search and edit very large XML data in one embodiment.

7. Example Illustrating Searching and Editing of Very Large XML Data

FIGS. 6 to 14B together illustrate the manner in which users are enabled to search and edit desired portions of a very large XML data in one embodiment. Each of the Figures is described in detail below.

Figure 6:
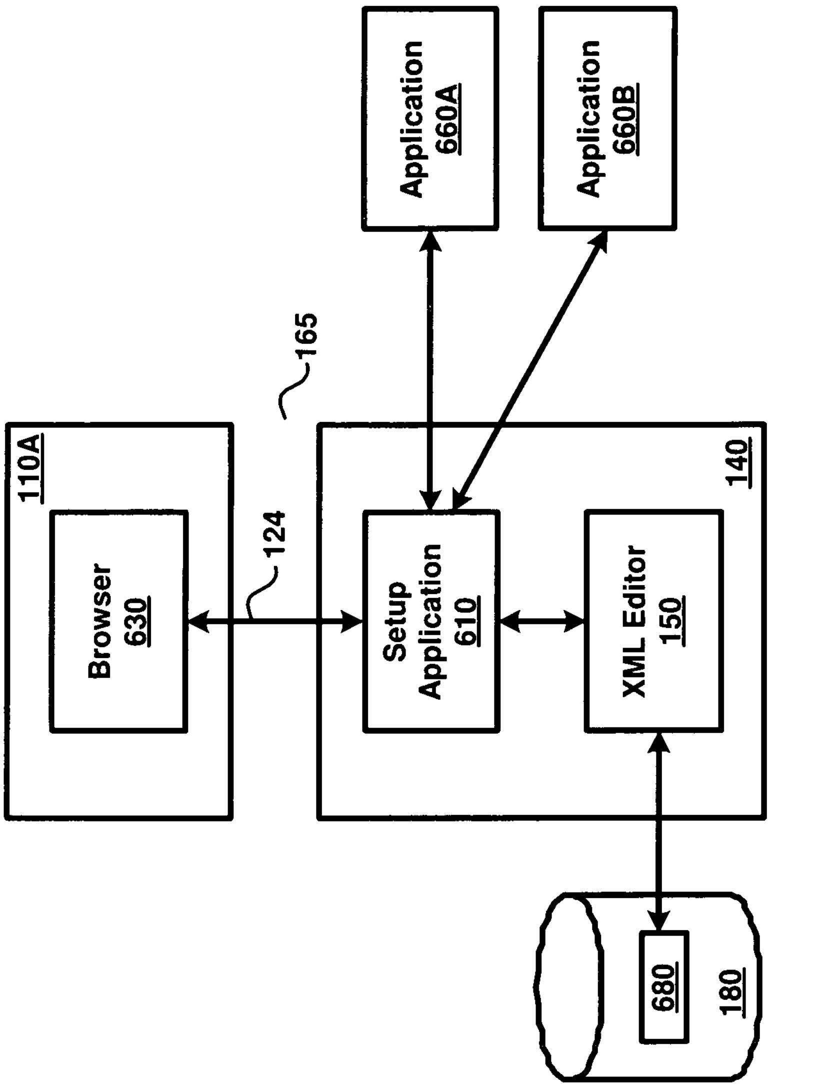
FIG. 6 is a block diagram illustrating an environment in which users are enabled to search and edit very large XML data in one embodiment.

FIG. 6 is a block diagram illustrating an environment in which users are enabled to search and edit very large XML data in one embodiment. However, the features of the invention can be applied in other environments as well, as will be apparent to one skilled in the relevant arts by reading the disclosure provided herein.

Server system 140 is shown executing setup application 610 along with XML editor 150. Setup application 140 enables users to migrate data between multiple instances of an enterprise application (for example EAI 660A and EAI 660B). The migration is performed by exporting the desired data from the first instance (EAI 660A) in the form of a very large XML data and then importing the XML data into the second instance (EAI 660B).

In one embodiment, setup application 610 corresponds to Oracle iSetup available from Oracle Corporation and enterprise application instances EAI 660A-660B corresponds to different instances of Oracle E-Business Suite Application also available from Oracle Corporation. However, the various features described herein can be implemented in various other products provided by different vendors.

Client system 110A is shown executing browser 630 which provides an interface used by users to control migration of data using setup application 610. Browser 310 is designed to send requests (e.g., in the form of URLs) to setup application 610 (via path 124) and to receive in response, corresponding interface related data, for example, files encoded in hypertext markup language (HTML) termed web pages, from setup application 610.

Browser 310 then generates an interface corresponding to the web pages on a portion of a display unit (not shown) associated with client system 110A. Browser 310 also sends the information specified in the web pages to setup application 610. In one embodiment, browser 310 corresponds to Internet Explorer 6.0 available from Microsoft Corporation.

Thus, the users are provided the ability to migrate of data (in the form of very large XML data) between multiple instances of an enterprise application. However, the users may desire to edit the XML data being migrated. For example, a user may wish to customize/configure the data for the target/second instance of the enterprise application.

XML editor 150 provided according to several aspects of the present invention enable users to edit the XML data before importing the data in the second instance of the enterprise application. Though XML editor 150 is shown as an entity different from (or loosely coupled with) setup application 610, it may be appreciated that in alternative embodiments, XML editor 150 may be provided as a part of (or tightly coupled with) setup application 610.

XML editor 150 receives the XML data to be edited (and the associated metadata) from setup application 610 and pre-processes the XML data to generate a corresponding tabular data which is then stored in database 680 (shown contained in database server 180). Database server 180 is implemented as a relational database having the ability to directly process XML type data using SQL queries. In one embodiment, database server 180 corresponds to Oracle Database Server 10g available from Oracle Corporation.

XML editor 150 then receives requests for editing the XML data from users (routed via setup application 610), generates queries corresponding to the requests, and performs the queries on the tabular data contained in database 680.

On receiving an indication indicating that the editing of the XML data is complete, XML editor 150 generates the edited XML data from the tabular data stored in database 680. The edited XML data with the user specified changes can then be imported into the second instance of the enterprise application.

The description is continued describing a sample portion of a very large XML data (to be edited) based on a corresponding metadata (received from setup application 610) in one embodiment.

8. Example Very Large XML Data and Corresponding Metadata

FIGS. 7A-7C together depicts a sample portion of a very large XML data (received from setup application 610) to be edited in one embodiment. Though a very larger XML data generally contains elements/attributes (and corresponding values) in the order of thousands/millions, only a few representative elements/attributes of the XML data are included in the sample portion for purpose of illustrating the various features of the invention.

Line 701 indicates that the following data is encoded in XML. Lines 702-793 (between tags "<CalendarSetupAM>" and "</CalendarSetupAM>") represents sample portion of a very large XML data related to specifying the details of different types of calendars (in the form of a set of periods).

The start tag "<CalendarSetupAM>" and the end tag "</CalendarSetupAM>" is viewed as forming an element with name "CalendarSetupAM", with the data contained between the tags representing the value corresponding to the element. The element may also have associated attributes (such as "ID", "MIN_API_VERSION" shown in line 702) with corresponding values (such as "BE" and "120.5"). Only the names of the elements are referred to in the following description for conciseness.

Lines 704-792 (element "PeriodSetsVO") specifies a set of periods identified by the identifier "VIEW", which in turn contains a first set of periods (shown in lines 704-760) and a second set of periods (shown in lines 761-790).

Lines 705-707 (elements "PeriodSetName", "Description", "Context") respectively specify the name "JEBE_MONTH_VAT", the description "Belgian Localisation Monthly VAT Calendar", and the context " " corresponding to the first set of periods.

Lines 708-720 (element "PeriodsVO") specify the details of a single period contained in the first set of periods. In particular, lines 709-719 respectively specify the name, the start date, the end date, the year, the number, the quarter number, the entered name, the adjustment flag, the description, the context, and the user type corresponding to the single period (using the corresponding elements). Similarly, lines 721-733, 734-746, 747-759 specify other periods contained in the first set of periods.

Lines 762-764 are similar to the lines 705-707 and respectively specify the name "GL_CALENDAR", the description "GL ACCOUNTING CALENDAR" and the context "" corresponding to the second set of periods. Lines 765-777 and 778-790 are similar to lines 708-720 and specify the details of different periods contained in the second set of periods.

The description is continued describing a metadata (that may also be received from setup application 610) associated with the above described sample portion of the XML data in one embodiment.

FIG. 8A depicts a portion of a metadata specifying the keys on which a very large XML data (sample portions of which is shown in FIGS. 7A-7C) can be searched in one embodiment.

Line 821 represents a comment as indicated by the "#" character at the beginning the line thereby causing the line to be ignored during execution of XML editor 150. Line 821 indicates that the keys corresponding to a record/element are to be specified as a comma-separated list of values.

Accordingly, line 822 specifies a key "PeriodSetName" corresponding to the element "PeriodSetsVO", while line 823 specifies a set of keys "PeriodName" and "UserPeroidType" corresponding to the element "PeriodsVO". It may be observed that line 823 is also specified as a comment, and as such is ignored during processing of the received very large XML data.

FIG. 8B depicts a portion of a metadata specifying the elements/attributes of a very large XML data (sample portions of which is shown in FIGS. 7A-7C) that can be edited in one embodiment. It may be appreciated that such a restriction on the elements/attributes that can be edited, enables an administrator to control the specific portions of the migration data than can (and cannot) be edited by users. By leaving the metadata of FIG. 8B blank, none of the data of FIGS. 7A-7C can be edited, according to one convention.

Line 851 depicts a comment specifying that the editable elements/attributes for a corresponding record/element are to be specified as a comma-separated list of values. Accordingly, line 852 specifies that the element "PeriodSetName" contained in the record/element "PeriodSetsVO" is editable, while line 853 specifies that the elements "PeriodName" and "EnterPeroidName" of the element/record "PeriodsVO" are editable.

Thus, XML editor 150 receives the sample portion of a very large XML data shown in FIGS. 7A-7C and the corresponding metadata shown in FIGS. 8A-8B from setup application 610 (in one embodiment, in the form of files/documents). XML editor 150 then preprocesses the received XML data to generate a corresponding tabular data as described below with examples.

9. Example Illustrating Preprocessing of a Very Large XML Data

FIGS. 9A-9D and 10A-10B together illustrate the manner in which a very large XML data is preprocessed to generate a corresponding tabular data in one embodiment. Each of the Figures is described in detail below.

As described above with respect to FIG. 3, XML editor 150 first converts the received portion of the very large XML data (shown in FIGS. 7A-7C) to a generic XML data which contains data associated to a predefined set of elements/attributes. In one embodiment, the conversion is performed using a SAX parser as described above.

FIGS. 9A-9D depicts a portion of a generic XML data generated corresponding to a very large XML data (sample portions of which is shown in FIGS. 7A-7C) in one embodiment. The example here is based on a specific set of elements/attributes for the generic XML, but different set of elements/attributes can be chosen as suited for the specific environment, as will be apparent to one skilled in the relevant arts by reading the disclosure provided herein. In general, the elements/attributes set needs to cover all the expected elements/attributes of different XML data desired to be edited.

Line 901 indicates that the following data is encoded in XML. Lines 902-921A (element "EXT") represents generic data generated corresponding to the sample portion of the very larger XML data depicted in FIGS. 7A-7C. The associated attributes "req_id" and "source" respectively indicates the identifier of the request "123400" and the identifier of the very larger XML data "PeriodSets" based on which the generic XML data is generated. The request identifier may be specified by a user or generated by XML editor 150 to uniquely identify the received XML data, while the identifier of the XML data may correspond to the name or the location of a document/file containing the XML data.

Lines 903-907 (element "H") specify the details of the specific element "CalendarSetupAM" contained in the received XML data. In particular, the attribute "DP" in line 903 specifies the depth "1" of the specific element, that is, the hierarchical position of the specific element with respect to the root element of the received XML data.

It may be appreciated that the different occurrences of element "H" represent different records (business entities) that may be desired to be edited. The specific elements/attributes in the received XML data to be encoded as element "H" may be performed in a predetermined manner. In one embodiment, XML elements in the received XML data which contain other elements (that is, sub elements) are encoded as element "H" in the generic data.

Line 904 (elements "T", "ID" and "PID") respectively specify a flag to indicate whether the specific element is a top level (value "−1") or a nested (value indicating the nesting depth) element/record, a unique identifier associated with the element (as generated by XML editor 150) and the unique identifier corresponding to the parent (the element containing the specific element, with the value "0" indicating that the specific element is not contained in any other element) of the specific element "CalendarSetupAM".

Line 905 (elements "HC" and "HD") respectively specify a hash code and a hash detail generated corresponding to the specific element to facilitate searching of the XML/tabular data. Line 906 (elements "S", "N", and "D") respectively specify the business entity name "PeriodSets" (same as the value of the "source"), the name "CalendarSetupAM" and the display name "Calendar Setup" corresponding to the specific element. The display name may be specified in the received XML data or generated from the name in a known way, for example, by inserting a space character before each upper case character occurring in the name and then removing trivial words containing only one letter.

Similarly, lines 908-915 specify the details of another element "PeriodSetsVO" contained in the received XML data (corresponding to the first set of periods shown in lines 704-760. It may be observed that the depth the element is indicated to be "3" since the element is contained in the element "CalendarSetupAM" and the element "PeriodSetsVO".

Further, the element "PID" is associated with the parent identifier "1" which corresponds to the identifier of "CalendarSetupAM" (in line 904) thereby indicating that the element "PeriodSetsVO" is contained in the element "CalendarSetupAM".

Each of lines 912-914 (element "V") specifies the details of sub elements/attributes contained in the element "PeriodSetsVO". In particular line 912 specifies the details of a specific sub element/attribute "PeriodSetName". The associated attributes "N" and "D" specify the name (as specified in the receive XML data) and the display name (generated or specified as described above) corresponding to the specific sub element/attribute.

The value of "Y" for the attribute "U" indicates that the specific sub element/attribute is a key on which the XML data can be searched (with a value of "N" or the absence of the attribute "U" indicating otherwise). Similarly, the value "1" for the attribute "T" indicates that the specific sub element/attribute is editable (with a value of "0" indicating otherwise).

It may be observed that the specific sub element/attribute "PeriodSetName" is indicated to be a key as specified by the metadata of FIG. 8A (in line 822) and also to be editable as specified by the metadata of FIG. 8B (in line 852).

Similarly, lines 916-931, 932-947, 948-963, 964-979 respectively specify the details corresponding to the different occurrences of the element "PeriodsVO" in the received sample portion of the XML data (as shown in lines 708-720, 721-733, 734-746, and 747-759). Lines 980-921A is generated corresponding to the details of another occurrence of the element "PeriodSetsVO" in the received XML data (corresponding to the second set of periods shown in lines 761-790).

It may be observed the elements ("EXT", "H" and "V") represent predefined elements according to a predefined (generic) XML schema and the values for the different occurrences of the elements are determined based on the XML data sought to be edited. It may be also appreciated that any XML data sought to be edited, could be converted using the same generic XML schema since none of the elements of the received XML data are retained in the generic XML data.

Further, due to representation of each received XML data in the form of corresponding generic XML data, similar queries (shown, for example, in FIGS. 11B and 12B described below) may be programmatically generated irrespective of the user defined scheme based on which each received XML data is described.

Thus, the XML data received is converted to a generic XML data containing data associated as values corresponding to a predefined set of elements/attributes. XML editor 150 then creates a tabular data corresponding to the received XML data based on the generic XML data as described below with examples.

FIGS. 10A and 10B together depicts a portion of a tabular data corresponding to a very large XML data (sample portions of which is shown in FIGS. 7A-7C) in one embodiment. Table 1000 depicts a portion of a tabular data indicating the details of elements/attributes contained in the received XML created data based on the generic XML data generated from the received XML data as described above with respect to FIGS. 9A-9D.

Columns 1021 "Name" and 1022 "Display Name" respectively specifies the name and display name of for the corresponding elements/attributes as specified in the received XML data and correspond respectively to the values indicated the elements/attributes "N" and "D" in the generic XML data generated for the corresponding elements/attributes. Columns 1023 "Request_Id" and 1024 "Source" respectively indicate the identifiers of the request and the identifier of the received XML and correspond to the values indicated by the attributes "req_id" and "source" associated with element "EXT" in the generic XML data.

Columns 1025 "Type", 1026 "Id", 1027 "Parent_Id", 1028 "Hashcode_Details" and 1029 "Depth" respectively indicate the type, the unique identifier, the identifier of the parent, the hash detail and the depth for the corresponding elements/attributes contained in the received XML data and respectively correspond to the values of the elements "T", "ID", "PID", "HD" and attribute "DP" in the generic XML data generated for the corresponding elements/attributes. Column 1030 "Is_Transformed" indicates whether the value associated with the corresponding element/attribute has been edited, with a value "Y" indicating that the associated value has been edited and a value "N" otherwise.

Column 1031 "ATTR_DIFF" is an XML column storing an XML value representing the (sub) elements/attributes contained in the corresponding elements/attributes of the received XML data. The XML values in column 1031 are shown as " . . . " indicating that the XML values may be maintained elsewhere other than in the tabular data, for example, as a BLOB/CLOB (binary/character large object) in a file/document stored on a non-volatile memory. The individual elements/attributes in the XML values may be accessed using a DOM approach.

FIG. 10B depicts a scenario where XML values (of column 1031) representing the (sub) elements/attributes contained in the corresponding elements/attributes of the received XML data are maintained in the tabular data in one embodiment. It may be observed that an XML value corresponding to an element/attribute is created by including all the occurrences of the element "V" (corresponding to the sub elements/attributes) in the generic XML data generated corresponding to the elements/attribute.

Further, each occurrence of the element "V" is created to contain an element "A" associated with the value of element "V" in the generic XML data. The value of element "A" represents the old value of the sub element/attribute, with the new value (as specified by the user) represented by the value of element "B" (not shown, since no edits have been performed). The occurrences of the element "V" are then included in the element "H" and maintained associated with the corresponding element/attribute.

Though not shown, it may be appreciated that the element "H" may be associated with attributes such as "xmlns:xsi" and "xsi:noNamespaceSchemaLocation" (having corresponding values) to facilitate faster processing of the XML values stored in column 1031.

Referring to FIG. 10A, each of rows 1051-1059 specifies details corresponding to elements/attributes contained in the received sample portion of a very large XML data (as depicted in FIGS. 7A-7C).

In particular, row 1052 specifies various details corresponding to element "PeriodSetsVO" such as the name "PeriodSetsVO", the display name "Period Sets", the request identifier "123400", the identifier of the XML data "PeriodSets", the type "0", the unique identifier "3", the identifier of the parent "1" (indicating that it is contained in element "CalendarSetupAM" depicted in row 1051), the hashcode detail "3PeriodSetsVOPeriod SetNameJEBE_MONTH_VAT", and the depth "3". The value "N" of column 1030 indicates that the element "PeriodSetsVO" has not been edited/transformed.

Referring to FIG. 10B, the XML value in column 1031 corresponding to row 1052 indicates that sub elements/attributes such as "PeriodSetName", "Description", and "Context" contained in the element "PeriodSetsVO".

It may be observed that the values in row 1052 corresponds to values for various predefined elements/attributes (as described above) contained in the generic XML data (in lines 916-931) which in turn was generated corresponding to element "PeriodSetsVO" in the received XML data (in lines 708-720). As such, the data contained in row 1052 captures the same information specified in the corresponding element/attribute of the received XML data. Similarly, rows 1051 and 1053-1059 represent/capture the information contained in other elements/attributes of the received XML data.

Thus, XML editor 150 preprocesses a very large XML data to be edited and generates a corresponding tabular data. The tabular data is then stored in a staging table in a database, for example, database 680 in database server 180. XML editor 150 may now receive requests for searching and/or editing the XML data. The description is continued describing the manner in which searching of a very large XML data is provided in one embodiment.

10. Example Illustrating Searching of a Very Large XML Data

Figure 11A:
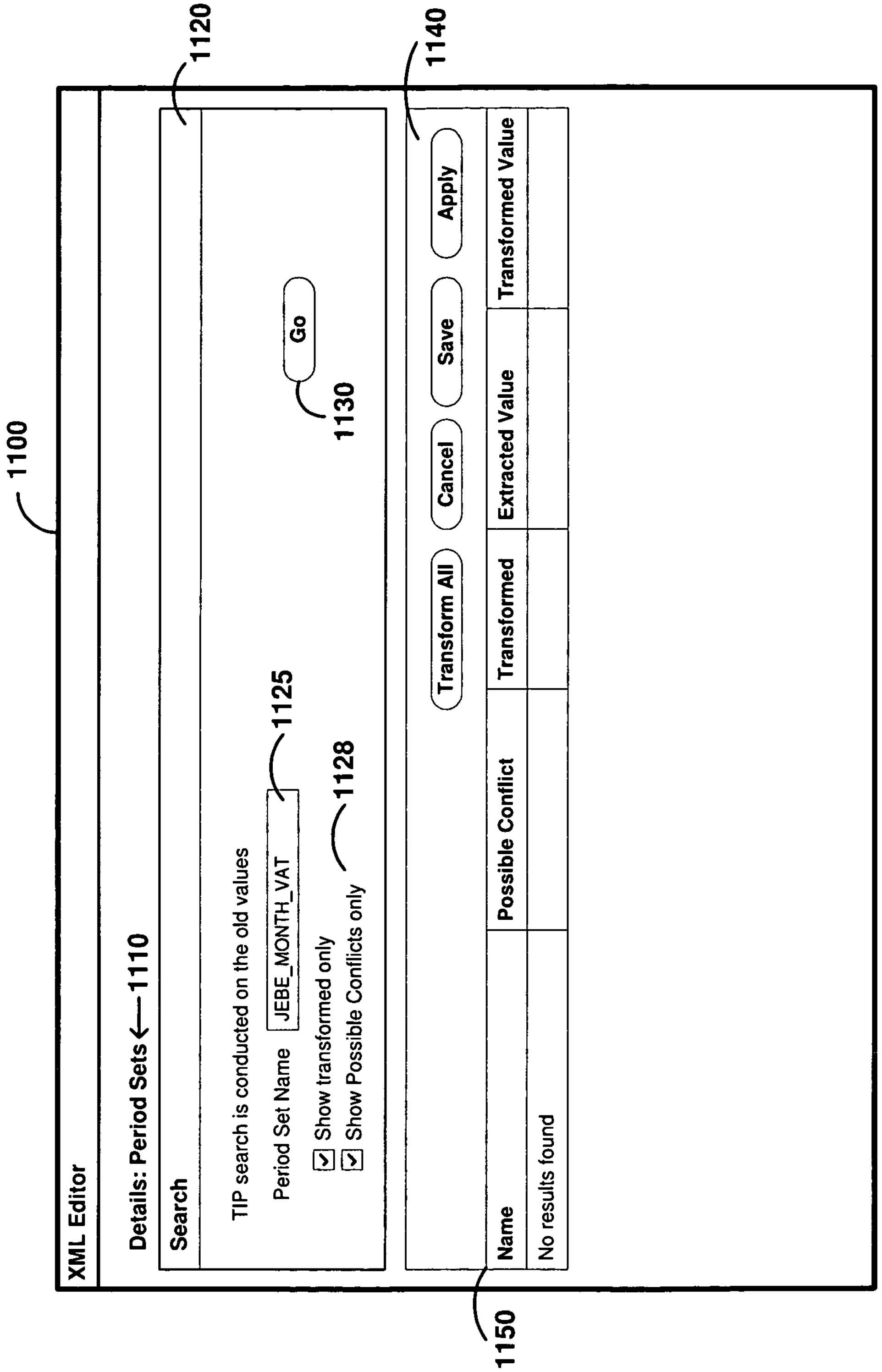
FIG. 11A depicts a user interface facilitating users to search for desired portions of a very large XML data in one embodiment.

FIGS. 11A and 11B together illustrate the manner in which searching for desired portions of a very large XML data is provided in one embodiment. Each of the Figures is described in detail below.

FIG. 11A depicts a user interface facilitating users to search for desired portions of a very large XML data (sample portions of which is shown in FIGS. 7A-7C) in one embodiment. The user interface may be displayed in a scenario that a user desires to search and edit a very large XML data to be migrated between multiple instances of an enterprise application.

The description is continued assuming that a very large XML data (sample portions depicted in FIGS. 7A-7C) along with a corresponding metadata (as shown in FIGS. 8A-8B) is received prior to the display of display area 1100 and preprocessed to generate a corresponding tabular data (as shown in FIG. 10A-10B). The tabular data is stored in a staging table (with the format similar to the tabular data shown in FIGS. 10A-10B) in database 680.

Display area 1100 depicts a user interface displayed in response to a user request (received from a user using browser 630 in one of client systems 110A-110B) indicating a desire to search a very larger XML data. Display area 1100 (and 1200) are displayed by browser 630 on a display unit (not shown) associated with the requesting client system. Text 1100 "Period Sets" indicates the specific portion (or the identifier of the file/document) containing the very large XML data that is desired to be searched and edited during migration.

Display area 1120 depicts a search panel which enables users to specify a search request. The search panel is generated based on the keys specified in the metadata and as such a text field 1125 labeled "Period Set Name" (corresponding to the key specified in line 822 of FIG. 8A) is included in the search panel. Other options such as the ability to search for previously edited/transformed values may also be provided. Button 1130 enables the user to send the search request to XML editor 150 for processing.

Display area 1140 and table 1150 together constitute a result panel displaying the result of a search request. In particular, display area 1140 provides various actions (in the form of buttons) that can be performed with the values in table 1150, while table 1150 depicts the details of portions of the XML data matching the search request. Table 1150 is shown containing the rest "No results found" indicating the absence of a previous search or the failure of the criteria specified in the previous search to match any portion of the XML data.

Thus, a user can specify in text field 1125, a desired value (such as "JEBE_MONTH_VAT") to be matched with the various values of the element "PeriodSetName" and then click/select button 1130 to send the desired value and the name/identifier of the corresponding element in the form of a criteria in a search request to XML editor 150.

XML editor 150 on receiving the search request first generates a search query corresponding to the received search request as described in detail below.

FIG. 11B depicts a search query generated corresponding to a search request received from a user for searching desired portions of a very large XML data in one embodiment. As described above, the search query is generated in the form of a SQL query directed to the staging table storing the tabular data corresponding to the very large XML data.

Lines 1171-1185 depict a search query generated by XML editor 150 corresponding to a search request (for example, the search request received from display area 1100 as described above). The keyword "SELECT" (all keywords in SQL are depicted in capital case) in line 1171 indicates that the specific information (as indicated by lines 1171-1181) contained in the rows of the tabular data matching the criteria specified after the keyword "WHERE" in lines 1184-1185 are to be retrieved from tables indicated after the keyword "FROM" in lines 1182-1183.

Thus, lines 1171-1181 specifies that the name (as indicated by the XPATH "/V/@N"), the old value "/V/A", the new value "/V/B", the identifier "id" (column 1026), the parent identifier (column 1027), a flag "is_different" with value "N", the display name "/V/@D" etc. are to be retrieved from each matching element/attribute in the tabular data.

Line 1182 indicates the name "az_diff_results" of the staging table which contains the tabular data to be searched. Line 1183 indicates that the XML values contained in column 1031 "ATTR_DIFF" for the matching rows are to be converted into a table containing all the attributes corresponding to each given record/element in the XML value.

Line 1184 identifies the specific tabular data corresponding to the received XML data by specifying the request identifier and the "source" identifier identifying the XML data. Line 1185 indicates the specific criteria based on which the search is to be performed. The specific criteria indicates that the hashcode detail (column 1028) of the rows in the tabular data is to be matched with the value of the variable "HashedPeriodSetName".

The value of the variable "HashedPeriodSetName" may be determined by generating the hashcode detail of the value specified in the search request. In the scenario, that the search request is received from display area 1100 with the criteria specifying that the values of the element "PeriodSetName" are to be matched with the value "JEBE_MONTH_VAT", the corresponding value of the variable "HashedPeriodSetName may be determined to be "3PeriodSetsVOPeriodSetNameJEBE_MONTH_VAT", which may then be substituted in place of the variable in the search query.

Thus, the search query corresponding to the search request is generated. XML editor 150 then performs the search query on database 680 containing the staging table and identifies the elements/attributes in the XML data matching the user specified criteria. It may be observed that the value of hashcode detail corresponding to the user specified criteria matches the hashcode detail corresponding to row 1052, and as such XML editor 150 identifies the portion of the XML data corresponding to row 1052 as matching the user specified criteria.

XML editor 150 then sends the identified portions (in the form of a web page) as a response to the search request to the requesting client system (or corresponding browser 630). The response may contain the identifiers of the element/attributes contained in the identified portions, the corresponding values and other desired information. In the above example, the response may contain the identifier "3" of the identified portion (corresponding to row 1052), the names, and values corresponding to the elements "PeriodSetName", "Description", "Context", etc.

In a scenario where a metadata (as shown in FIG. 8B) indicates a specific set of elements/attributes of the XML data as being editable, XML editor 150 generates and sends an interface (web page) in which only the specific set of element/attributes indicated by the metadata are allowed to be edited. Thus, in the above-described example, the interface (web page) generate allows only the value of element "PeriodSetName" to be edited while allowing the values of the other elements to be viewed.

Browser 630 on receiving the response (web page) displays a corresponding interface on the display unit (as shown in FIG. 12A described below). The user may then have a desire to edit the editable elements. Accordingly, the description is continued describing the manner in which editing of a very large XML data is provided in one embodiment.

11. Example Illustrating Editing of a Very Large XML Data

FIGS. 12A and 12B together illustrate the manner in which users are enabled to edit a very large XML data in one embodiment. Each of the Figures is described in detail below.

FIG. 12A depicts a user interface enabling users to edit a very large XML data (sample portions of which is shown in FIGS. 7A-7C) in one embodiment. Display area 1200 depicts a user interface displayed in response to a search request (as depicted in FIG. 11A) directed to the XML data with name "PeriodSets" (as indicated by text 1210).

Display area 1220 depicts a search panel similar to display 1120 and therefore the description is not repeated in detail for conciseness. In particular, the search panel indicates that the result panel (display area 1240 and table 1250 together) depicts the result of a search request where the value "JEBE_MONTH_VAT" was desired to be matched with the various values of the element "PeriodSetName".

Display area 1240 provides various actions (in the form of buttons) that can be performed with the values in table 1250. For example, the button labeled "Save" can be used to send a request to edit the XML data to XML editor 150.

Table 1250 depicts the details of elements/attributes of the XML data matching the search request specified in the search panel. Column 1251 "Name specifies the name of the corresponding matching element/attribute. Column 1252 "Possible Conflict" indicates whether the value of the corresponding element/attribute possibly has conflicts with other values in the XML data. Column 1253 "Transformed" indicates whether the value of the corresponding element/attribute has already been edited or transformed. Column 1254 "Extracted Value" specifies the current value of the corresponding matching element/attribute. Column 1255 "Transformed Value" enables users to specify a new value for the corresponding element/attribute (based on the metadata).

Each of rows 1261-1265 specifies the details of a corresponding element/attribute matching the criteria specified in the search panel. Row 1261 specifies the details corresponding to the element "PeriodSetsVO" matching the criteria, with rows 1262-1264 specifying the details of the corresponding sub elements/attributes such as "PeriodSetName", "Description", and "Context" contained in the element "PeriodSetsVO".

Row 1265 specifies the details of another occurrence of element "PeriodSetsVO" (partially shown). Though not shown, other occurrences of the element "PeriodSetsVO" matching the criteria may also be present and displayed, for example, on scrolling the display downwards.

It may be observed the information displayed in rows 1261-1264 corresponds to the portion of the XML (row 1052 in FIGS. 10A-B) identified by XML editor 150 as matching the user specified criteria in a search request (sent by a user using the interface displayed in FIG. 11A).

Further, only row 1262 corresponding to the element "PeriodSetName" is shown containing text filed 1268 (for specifying a corresponding new value) since only the element "PeriodSetName" is indicated to be editable in the metadata depicted in FIG. 8B. Rows 1263-1264 merely display the (old) values of the corresponding elements, thereby preventing the user from editing the corresponding values.

A user wishing to edit the value of the element "PeriodSetName" may specify a new value "My Own Calendar" in corresponding text field 1268 and click/select the button labeled "Save" to send a request to edit the XML data to XML editor 150. The edit request may specify an identifier (such as the value "3") of the element "PeriodSetName" desired to be edited and the corresponding new value "My Own Calendar" of the element.

XML editor 150 on receiving the edit request first generates a query corresponding to the received request as described in detail below.

FIG. 12B depicts a query generated corresponding to a request for editing a portion of a very large XML data in one embodiment. As described above, the query is generated in the form of a SQL query directed to the staging table storing the tabular data corresponding to the very large XML data.

Lines 1271-1298 depict an update query generated by XML editor 150 corresponding to a edit request (for example, the request received from display area 1200 as described above). The keyword "UPDATE" in line 1271 indicates that the specific information after the keyword "SET" (as indicated by lines 1272-1297) are to be updated in the table "az_diff_results" specified in line 1271 for each the rows of the tabular data matching the criteria specified after the keyword "WHERE" in lines 1298.

Thus, line 1281 indicates the name "az_diff_results" of the staging table which contains the tabular data to be updated, while line 1282 indicates that the XML value in the column "ATTR_DIFF" is to be updated with the new value specified by lines 1273-1297 for the rows (for example, row 1052) in the tabular data that have request_id as "123400", the source as "PeriodSets" and have a unique identifier having the value "3" (as indicated in line 1298).

Lines 1273-1297 specify a "SELECT" query which indicates that the XML value contained in the column "ATTR_DIFF" is to be transformed based on a XSL portion specified in lines 1273-1295 for each of the rows of the tabular data (stored in the table "az_diff_results" as indicated in line 1296) that have request_id as "123400", the source as "PeriodSets" and have a unique identifier having the value "3" (as indicated in line 1297).

It may be observed that the criteria for retrieving the XML values specified in the line 1297 is similar the criteria for updating the XML values specified in line 1298, indicating that the XML values corresponding to the matching rows are first retrieved, and then transformed based on the XSL portion specified to generate corresponding new XML values, which are then stored back in the same matching rows. The transformation of the XML value ensures that the new value of the specific element specified by the user is stored in the staging table.

Lines 1275-1294 specifies the manner the transformation is to be performed corresponding to each occurrence of the element "H" in the XML value. In particular, lines 1278-1292 specify the manner the transformation is to be performed corresponding to each occurrence of the element "V" contained in the element "H" in the XML data. Line 1279 indicates that all attributes of the element "V" except the attribute "A2" are to be copied to the new XML value.

Lines 1280-1290 indicate that lines 1282-1284 are to be performed only when the name of the attribute "N" associated with the element "V" matches the value "PeriodSetName", and that lines 1287-1288 are to performed otherwise. Lines 1287-1288 indicate that the elements "A" and "B" (and their corresponding values) contained in the element "PeriodSetName" are to be copied to the new XML.

In line 1282, the value of a (new) attribute "A2" is set to "Y". The attribute "A2" represents a dirty flag indicating that the value of the element "PeriodSetName" has been modified. The dirty flag may be used as the based on updating/refresh the user interface (as shown in display area 1200) after successful performance of the query. In line 1283, the value of the element "A" (representing the old value) is copied to the new XML, while in line 1284, a (new) element "B" (representing the new value) is created in the new XML with a corresponding new value "My Own Calendar".

Thus, all the occurrences of the element "V" are copied to the new XML value (after transformation) except the element "V" having the name "PeriodSetName", which is modified to include a corresponding new value. A dirty flag is also generated indicating the change of value of the specific element "V".

It may be appreciated that the value "PeriodSetName" for matching the name attribute in line 1281, the new value in line 1284 and the value "3" of the identifier identifying the specific row in the tabular data (staging table) in lines 1297 and 1298 may be contained in the edit request received from the user (or determined appropriately).

XML editor 150 performs the above update query resulting in the storage of the new value corresponding to the specific element in specific rows (row 1052) of the tabular data (staging table) contained in database 680. The description is continued describing the manner in which the tabular data is updated on performance of the above-described update query in one embodiment.

FIG. 12C depicts a portion of the tabular data indicating the manner in which update of a new value corresponding to an element is performed in one embodiment. Only the values of column 1031 are depicted for conciseness, with the values in the other columns being similar to the values depicted in FIG. 10A.

The XML values contained in rows 1251-1255 (correspond to rows 1051-1055 described above with respect to FIG. 10B) represent a portion of the tabular data updated with a new value "My Own Calendar" corresponding to the element "PeriodSetName) as indicated by an edit request from a user. It may be observed that the XML value (shown in bold) in row 1252 has been transformed such that the element "V" with name "PeriodSetName" includes the attribute "A2" (with a value of "Y") and a new element "B" having the new value "My Own Calendar".

Thus, a request to edit the very large XML data is performed and the new value corresponding to the specific element (as indicated in the request) is stored in the tabular data contained in a staging table. Though the above description depicts the update of the value corresponding to only one element, it may be appreciated that requests to edit multiple elements/attributes can be similarly processed in a single request, as will be apparent to one skilled in the relevant arts by reading the disclosure provided herein.

XML editor 150 after processing the edit request may send a status message along with the old/new values (in the form of a web page) as a response to the request to the requesting client system (or corresponding browser 630). Browser 630 on receiving the response (web page) displays a corresponding interface (similar to display area 1200) on the display unit, which displays the status message and the old/new values of the updated element/attribute.

The user may then send other edit requests to XML editor 150 for editing the same/different elements/attributes using browser 630. XML editor 150 may process the other edit requests similar to the manner described above. Thus, users are enabled to edit a very large XML data.

Further, according to an aspect of the present invention, XML editor 150 can be designed to process requests to edit the very large XML data received from multiple users simultaneously. For example, XML editor 150 can be designed to first store the search/edit requests received from different users in a request queue. The request queue can then be processed based on the priority of the requests (for example, process search requests prior to processing edit requests) in a known way as will be apparent to one skilled in the relevant arts.

Thus, same/different users are enabled to edit same/different portions of a very large XML data. After completing the editing of the very large XML data, a user may desire to generate a result XML data containing all the changes/edits performed.

Referring to FIG. 12A, display area 1200 is shown containing button 1270 (labeled "Freeze") which enables users to send an indication (in the form of a request) to XML editor 150 indicating that the editing of the very large XML data is complete. Thus, a user after completing editing of a very large XML data may click/select button 1270 to send an indication of completion to XML editor 150.

XML editor 150 on receiving such an indication constructs a new XML data from the edited tabular data stored in the staging table in database 680 as described below with examples.

12. Constructing a New Very Large XML Data

FIGS. 13A-13B together illustrates the manner in which a new very large XML data containing the edits/changes performed by users is constructed from a corresponding edited tabular data in one embodiment. Each of the Figures is described in detail below.

FIG. 13A depicts a query performed in response to receiving an indication to construct a new very large XML data containing the edits/changes performed by users in one embodiment. As described above, the query is generated in the form of a SQL query directed to the staging table storing the edited tabular data (corresponding to the very large XML data), which contains the edits/changes performed by the users.

Lines 1311-1322 depict a "SELECT" query indicating that the name, the identifier, the parent identifier and a new XML value (as column "SUB") contained in the rows of the tabular data having the request identifier as "123400" and the source as "PeriodSets" (as indicated in line 1321) are to be retrieved from the tabular data contained in table "az_diff_results" (as indicated in line 1320). The retrieved information is to be sorted based on the identifier (as indicated in line 1322).

The new XML value to be retrieved corresponds to the XML value contained in the column "ATTR_DIFF" transformed based on the XSL portion specified in lines 1312-1319. Lines 1314-1318 specifies the manner the transformation is to be performed corresponding to each occurrence of the element "H" in the XML value.

In particular, lines 1315-1317 specify the manner the transformation is to be performed corresponding to each occurrence of the element "V" contained in the element "H" in the XML data. Line 1316 indicates that the value of the attribute "N" is to be used to generate a corresponding new element in the new XML value while line 1317 indicates that the value of the element "B" (representing the new edited value) contained in the element "V" is to be used as the value corresponding to the new element.

Thus, an occurrence of element "V" such as "<V N='PeriodSetName' U='Y' D='Period Set Name' T='1' A2='Y'><A>JEBE_MONTH_VAT</A><B>My Own Calendar</B></V>" is transformed to the new XML value "<PeriodSetName>My Own Calendar </PeriodSetName>". Similarly all the occurrences of the element "V" and "H" are processed and the corresponding new XML generated. Thus, various portions of the new XML data are generated as a result of performance of the query as described in detail below.

FIG. 13B depicts a portion of the result of performance of a query (as shown in FIG. 13A) designed to construct a new very large XML data containing the edits/changes performed by users in one embodiment.

Columns 1331-1334 (respectively labeled "Name", "Id", "Parent_Id", and "SUB") specify the name, the identifier, the parent identifier, and the transformed XML corresponding to each element contained in the result. Each of rows 1341-1344 specify details of a corresponding element contained in the result, for example, row 1342 specifies the details of the element "PeriodSetsVO" as having the identifier "3" with parent identifier "1" and a transformed XML corresponding to the XML value in column 1031 of row 1252 in FIG. 12C. Similarly, rows 1341, 1342, and 1344 correspond respectively to rows 1251, 1254, and 1255 of FIG. 12C.

The result can be used to generate the new XML data. In one embodiment, the row having parent identifier as "0" is identified as the root element containing the XML value specified in corresponding column 1334 "SUB". The elements that are specified in the rows with parent identifier same as the identifier of the root element are also included in the root element. The operation may be recursively performed to generate the new XML data.

Thus, with respect to the above result, element "CalendarSetupAM" (in row 1341) is identified as the root element (parent identifier being "0") containing the XML value " ". The element "PeriodSetsVO" (in row 1342) along with the XML value specified in the corresponding column "SUB" is included in the element "CalendarSetupAM" since the parent identifier "1" is the same as the identifier "1" of the root element. Similarly, the occurrences of element "PeriodsVO" (in rows 1343-1344) and the respective XML values of column "SUB" are included in the element "PeriodSetsVO" since the parent identifier "3" is the same as the identifier "3" of the element "PeriodSetsVO". The operation may similarly be repeated for the other elements contained in the result, thereby generating the new XML data described below.

FIG. 13C depicts a portion of a new very large XML data constructed from a corresponding tabular data containing the edits/changes performed by users in one embodiment. Only a sample portion (corresponding to the XML portion generated from the portion of the result depicted in FIG. 13B) of the new vary large XML data constructed from the tabular data is shown for conciseness.

Lines 1361-1380 (similar to lines 701-720 described above with respect to FIG. 7A) represent a portion of a new very large XML data constructed from the tabular data depicted in FIG. 10A and FIG. 12C. It may be observed that in line 1365, the value "My Own Calendar" of the element "PeriodSet-Name" represents the new edited value specified by the user in an edit request as described in details above.

It may be appreciated that only the data values of corresponding elements/attributes are shown to be editable in the description above. However, alternative embodiments can be implemented to allow editing of the XML structure in a controlled manner (for example, the ability to add an entire record/business entity), as will be apparent to one skilled in the relevant arts by reading the disclosure provided herein.

Such an approach may entail providing an interface to enable users to send request containing the details of the entire record to be added, generating multiple insert queries corresponding to the requests, performing the queries to update the tabular data and constructing the new XML data from the updated tabular data.

It should be further appreciated that the features described above can be implemented in various embodiments as a desired combination of one or more of hardware, software, and firmware. The description is continued with respect to an embodiment in which various features are operative when software instructions are executed.

13. Digital Processing System

Figure 14:
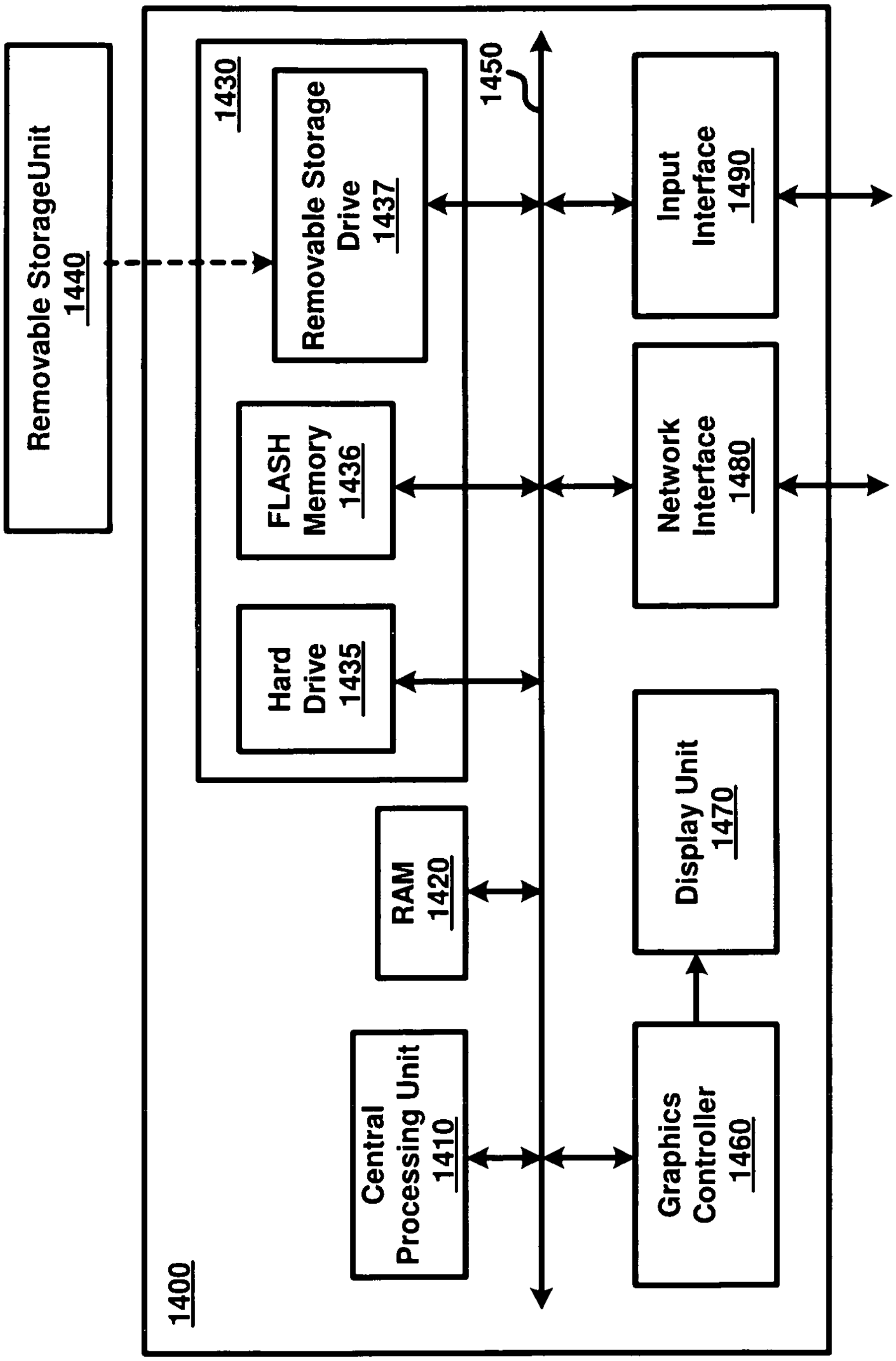
FIG. 14 is a block diagram illustrating the details of a digital processing system in which various aspects of the present invention are operative by execution of appropriate software instructions.

FIG. 14 is a block diagram illustrating the details of digital processing system 1400 in which various aspects of the present invention are operative by execution of appropriate software instructions. Digital processing system 1400 may correspond to one of server system 140 (or any other system executing XML editor 150) and client system 110A-110B.

Digital processing system 1400 may contain one or more processors (such as a central processing unit (CPU) 1410), random access memory (RAM) 1420, secondary memory 1430, graphics controller 1450, display unit 1470, network interface 1480, and input interface 1490. All the components except display unit 1470 may communicate with each other over communication path 1450, which may contain several buses as is well known in the relevant arts. The components of FIG. 14 are described below in further detail.

CPU 1410 may execute instructions stored in RAM 1420 to provide several features of the present invention. CPU 1410 may contain multiple processing units, with each processing unit potentially being designed for a specific task. Alternatively, CPU 1410 may contain only a single general-purpose processing unit. RAM 1420 may receive instructions from secondary memory 1430 using communication path 1450.

Graphics controller 1450 generates display signals (e.g., in RGB format) to display unit 1470 based on data/instructions received from CPU 1410. Display unit 1470 contains a display screen to display the images (corresponding to the user interfaces depicted in FIGS. 11A and 12A) defined by the display signals. Input interface 1490 may correspond to a keyboard and a pointing device (e.g., touch-pad, mouse). Network interface 1480 provides connectivity to a network (e.g., using Internet Protocol), and may be used to communicate with other connected systems (such as client systems 110A-110B) of FIG. 1.

Secondary memory 1430 may contain hard drive 1435, flash memory 1435, and removable storage drive 1437. Secondary memory 1430 may store the data (e.g., portions of data depicted in FIGS. 7A-7C, 8A-8B, 9A-9D, 10A-10B, 12C and 13B) and software instructions (e.g., designed to generate the portion of the queries depicted in FIGS. 11B, 12B and 13A, in general implement the logic of XML editor 150, described in the sections above), which enable digital processing system 1400 to provide several features in accordance with the present invention.

Some or all of the data and instructions may be provided on removable storage unit 1440, and the data and instructions may be read and provided by removable storage drive 1437 to CPU 1410. Floppy drive, magnetic tape drive, CD-ROM drive, DVD Drive, Flash memory, removable memory chip (PCMCIA Card, EPROM) are examples of such removable storage drive 1437.

Removable storage unit 1440 may be implemented using medium and storage format compatible with removable storage drive 1437 such that removable storage drive 1437 can read the data and instructions. Thus, removable storage unit 1440 includes a computer readable storage medium having stored therein computer software and/or data. However, the computer (or machine, in general) readable storage medium can be in other forms (e.g., non-removable, random access, etc.).

In this document, the term "computer program product" is used to generally refer to removable storage unit 1440 or hard disk installed in hard drive 1435. These computer program products are means for providing software to digital processing system 1400. CPU 1410 may retrieve the software instructions, and execute the instructions to provide various features of the present invention described above.

14. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A method of enabling users to edit data encoded in extended markup language (XML), said method comprising:

receiving a first XML data and a second XML data to be edited, said first XML data and said second XML data respectively containing a first plurality of elements and a second plurality of elements, said first plurality of elements being according to a first XML schema and said second plurality of elements being according to a second XML schema, wherein said first XML schema contains a first set of names such that each of said first plurality of elements is specified according to one of said first set of names, wherein said second XML schema contains a second set of names such that each of said second plurality of elements is specified according to one of said second set of names;

converting said first XML data and said second XML data into a first generic XML data and a second generic XML data, wherein both of said first generic XML data and said second generic XML data contain elements specified according to a common set of names of a pre-defined schema, wherein said pre-defined schema is different from each of said first XML schema and said second XML schema;

creating a tabular data corresponding to said first generic XML data to facilitate editing of said first XML data, and corresponding to said second generic XML data to facilitate editing of said second XML data;

storing said tabular data in the form of a staging table in a database, wherein said staging table stores a current XML data containing a first set of elements, said current XML data representing one of said first XML data and second XML data received for editing;

receiving a first request indicating that a first portion of said current XML data is to be replaced by a new portion, wherein said first portion is part of a first element of said first set of elements, wherein said first request is received after said storing;

generating a first query corresponding to said first request, wherein said first query is directed to said staging table in said database and is designed to cause said first portion to be replaced by said new portion in said tabular data; and performing said first query on said database to replace said first portion with said new portion in said tabular data.

2. The method of claim 1, wherein each of said first XML data and said second XML data is according to a corresponding hierarchy such that each element is at a corresponding depth in the corresponding hierarchy, wherein said common set of names includes a first name for specifying each complex element in the current XML data to be edited and the depth in the hierarchy of the complex element, wherein a complex element is an element containing other sub-elements at a lower depth in the hierarchy, wherein said common set of names also includes a second name for specifying each non-complex element in the XML data, wherein said first generic XML data and said second generic XML data contain elements having said first name and said second name.

3. The method of claim 2, further comprising receiving a metadata indicating a set of keys on which said first XML data can be searched and a set of editable names that are permitted to be edited, each of said set of keys and said set of editable names being one of said first set of names of said first XML schema, wherein said first generic XML data comprises:

a) a third set of elements, wherein each of said third set of elements is specified by said first name, wherein each of said third set of elements represents a corresponding element of said first XML data having one of said set of keys, wherein said third set of elements includes said first element; and b) a fourth set of elements, wherein each of said fourth set of elements is specified by said second name, wherein each of said fourth set of elements represents a corresponding element of said first XML data having one of said set of editable names.

4. The method of claim 3, wherein each of said third set of elements, including said first element, is stored as a corresponding row in said staging table, said staging table further comprises a column to store the corresponding portion of XML data in the form of XML, wherein said performing said first query comprises:

transforming data of said column corresponding to said first element using a XSL (Extensible Style sheet Language) to replace said first portion with said new portion; and storing said transformed data in said column corresponding to said first element, wherein said XSL is used for transforming said data of said column irrespective of whether said data is a representation of said first XML data or said second XML data in view of said converting of both of said first XML data and said second XML data according to said pre-defined schema.

5. The method of claim 3, further comprising:

receiving a second request indicating that a second portion of said current XML data is to be replaced by another new portion, wherein said second portion is part of said first element of said first set of elements, wherein said generating generates a second query corresponding to said second request, wherein said second query is also directed to said staging table in said database and is designed to cause said second portion to be replaced by said another new portion in said tabular data, and wherein said performing performs said second query on said database to replace said second portion with said another new portion in said tabular data.

6. The method of claim 5, further comprising:

receiving an indication that the editing of said current XML data is complete; and constructing a new XML data from said tabular data stored in said staging table in said database in response to said indication, wherein said new XML data constructed contains said new portion in the place of said first portion and said another new portion in place of said second portion.

7. The method of claim 5, further comprising:

receiving a search request specifying a criteria for finding desired portions of said current XML data, wherein said criteria is required to be specified based on only said third set of elements;

generating a search query corresponding to said search request, wherein said search query is directed to said staging table in said database;

identifying a set of portions of said current XML data matching said criteria by performing said search query on said tabular data stored in said staging table in said database, wherein said set of portions are part of said first element; and sending said set of portions as a response to said search request.

8. The method of claim 7, further comprising:

displaying said set of portions matching said criteria on a display unit; and enabling a user to send a plurality of requests indicating that respective desired ones of said set of portions are to be replaced with corresponding ones of a set of new portions, wherein said first request and said second request are contained in said plurality of requests.

9. The method of claim 8, wherein said displaying displays specific ones of said fourth set of elements contained in said first element on said display unit, wherein said enabling enables said user to only send requests for said specific ones of said fourth set of elements.

10. A non-transitory machine readable medium storing one or more sequences of instructions for causing a system to enable users to edit data encoded in extended markup language (XML), wherein execution of said one or more sequences of instructions by one or more processors contained in said system causes said system to perform the actions of:

receiving a first XML data and a second XML data to be edited, said first XML data and said second XML data respectively containing a first plurality of elements and a second plurality of elements, said first plurality of elements being according to a first XML schema and said second plurality of elements being according to a second XML schema, wherein said first XML schema contains a first set of names such that each of said first plurality of elements is specified according to one of said first set of names, wherein said second XML schema contains a second set of names such that each of said second plurality of elements is specified according to one of said second set of names;

converting said first XML data and said second XML data into a first generic XML data and a second generic XML data, wherein both of said first generic XML data and said second generic XML data contain elements specified according to a common set of names of a pre-defined schema, wherein said pre-defined schema is different from each of said first XML schema and said second XML schema;

creating a tabular data corresponding to said first generic XML data to facilitate editing of said first XML data, and corresponding to said second generic XML data to facilitate editing of said second XML data;

storing said tabular data in the form of rows in a database, wherein said rows stores a current XML data containing a first set of elements, said current XML data representing one of said first XML data and second XML data received for editing;

receiving a first request indicating that a first portion of said current XML data is to be replaced by a new portion, wherein said first portion is part of a first element of said first set of elements, wherein said first element is stored in a first row in said database, wherein said first request is received after said storing;

generating a first query corresponding to said first request, wherein said first query is designed to cause said first portion to be replaced by said new portion in said first row in said database; and performing said first query on said database to replace said first portion with said new portion in said first row.

11. The non-transitory machine readable medium of claim 10, wherein each of said first XML data and said second XML data is according to a corresponding hierarchy such that each element is at a corresponding depth in the corresponding hierarchy, wherein said common set of names includes a first name for specifying each complex element in the current XML data to be edited and the depth in the hierarchy of the complex element, wherein a complex element is an element containing other sub-elements at a lower depth in the hierarchy, wherein said common set of names also includes a second name for specifying each non-complex element in the XML data, wherein said first generic XML data and said second generic XML data contain elements having said first name and said second name.

12. The non-transitory machine readable medium of claim 11, further comprising one or more instructions for:

receiving a second request indicating that a second portion of said current XML data is to be replaced by another new portion, wherein said second portion is part of said first element of said first set of elements, wherein said generating generates a second query corresponding to said second request, wherein said second query is designed to cause said second portion to be replaced by said another new portion in said first row in said database, and wherein said performing performs said second query on said database to replace said second portion with said another new portion in said first row.

13. The non-transitory machine readable medium of claim 12, further comprising one or more instructions for:

receiving an indication that the editing of said current XML data is complete; and constructing a new XML data from the modified data stored in the rows in said database in response to said indication, wherein said new XML data contains said new portion in the place of said first portion and said another new portion in place of said second portion.

14. The non-transitory machine readable medium of claim 13, further comprising one or more instructions for:

receiving a metadata indicating a set of keys on which said first XML data can be searched and a set of editable names that are permitted to be edited, each of said set of keys and said set of editable names being one of said first set of names of said first XML schema, wherein said first generic XML data comprises:

a) a third set of elements, wherein each of said third set of elements is specified by said first name, wherein each of said third set of elements represents a corresponding element of said first XML data having one of said set of keys, wherein said third set of elements includes said first element; and b) a fourth set of elements, wherein each of said fourth set of elements is specified by said second name, wherein each of said fourth set of elements represents a corresponding element of said first XML data having one of said set of editable names;

receiving a search request specifying a criteria for finding desired portions of said current XML data, wherein said criteria is required to be specified based on only said third set of elements;

generating a search query corresponding to said search request, wherein said search query is directed to said database;

identifying a set of portions of said current XML data matching said criteria by performing said search query on said database, wherein said set of portions are part of said first element; and sending said set of portions as a response to said search request.

15. The non-transitory machine readable medium of claim 14, further comprising one or more instructions for:

displaying said set of portions matching said criteria on a display unit; and enabling a user to send a plurality of requests indicating that respective desired ones of said set of portions are to be replaced with corresponding ones of a set of new portions, wherein said first request and said second request are contained in said plurality of requests.

16. The non-transitory machine readable medium of claim 15, wherein said displaying displays specific ones of said fourth set of elements contained in said first element on said display unit, wherein said enabling enables said user to only send requests for said specific ones of said fourth set of elements.

17. A computing system comprising:

a database server;

a client system to enable a user to send a first XML data and a second XML data to be edited, said first XML data and said second XML data respectively containing a first plurality of elements and a second plurality of elements, said first plurality of elements being according to a first XML schema and said second plurality of elements being according to a second XML schema, wherein said first XML schema contains a first set of names such that each of said first plurality of elements is specified according to one of said first set of names, wherein said second XML schema contains a second set of names such that each of said second plurality of elements is specified according to one of said second set of names;

a server system operable to:

receive said first XML data and said second XML data;

convert said first XML data and said second XML data into a first generic XML data and a second generic XML data, wherein both of said first generic XML data and said second generic XML data contain elements specified according to a common set of names of a pre-defined schema, wherein said pre-defined schema is different from each of said first XML schema and said second XML schema;

create a tabular data corresponding to said first generic XML data to facilitate editing of said first XML data, and corresponding to said second generic XML data to facilitate editing of said second XML data; and store said tabular data in the form of rows in a database in said database server, wherein said rows stores a current XML data containing a first set of elements, said current XML data representing one of said first XML data and second XML data received for editing, said client system to also enable said user to send a first request indicating that a first portion of said current XML data is to be replaced by a new portion, wherein said first portion is part of a first element of said first set of elements, wherein said first element is stored in a first row in said database, said database server to receive said first request after said server systems stores said current XML data in said database server, generate a first query corresponding to said first request designed to cause said first portion to be replaced by said new portion in said first row in said database and perform said first query on said database to replace said first portion with said new portion in said first row, wherein at least one of said database server, said client system, and said server system comprises a processor and a memory, said processor enabled to retrieve instructions from said memory and to execute the retrieved instructions.

18. The computing system of claim 17, wherein said user sends a metadata indicating a set of keys on which said first XML data can be searched and a set of editable names that are permitted to be edited, each of said set of keys and said set of editable names being one of said first set of names of said first XML schema, wherein said first generic XML data comprises:

a) a third set of elements, wherein each of said third set of elements is specified by said first name, wherein each of said third set of elements represents a corresponding element of said first XML data having one of said set of keys, wherein said third set of elements includes said first element; and b) a fourth set of elements, wherein each of said fourth set of elements is specified by said second name, wherein each of said fourth set of elements represents a corresponding element of said first XML data having one of said set of editable names, wherein said user further sends a search request specifying a criteria for finding desired portions of said current XML data, wherein said criteria is required to be specified based on only said third set of elements, wherein said server system is designed to receive said search request, generate a search query corresponding to said search request directed to said database, identify a set of portions of said XML data matching said criteria by performing said search query on said database and send said set of portions as a response to said search request, wherein said set of portions are part of said first element.

19. The computing system of claim 18, wherein said client system receives and displays said set of portions on a display unit associated with said client system, wherein said user is enabled to send a plurality of requests to said server system indicating that respective desired ones of said set of portions are to be replaced with corresponding ones of a set of new portions, wherein said first request is contained in said plurality of requests.

20. The computing system of claim 17, wherein each of said first XML data and said second XML data is according to a corresponding hierarchy such that each element is at a corresponding depth in the corresponding hierarchy, wherein said common set of names includes a first name for specifying each complex element in the current XML data to be edited and the depth in the hierarchy of the complex element, wherein a complex element is an element containing other sub-elements at a lower depth in the hierarchy, wherein said common set of names also includes a second name for specifying each non-complex element in the XML data, wherein said first generic XML data and said second generic XML data contain elements having said first name and said second name.

21. The computing system of claim 20, further comprising:

a second client system to enable a second user to send a second request indicating that a second portion of said current XML data is to be replaced by another new portion, wherein said second portion is part of said first element of said first set of elements, wherein said server system is designed to receive said second request, generates a second query corresponding to said second request designed to cause said second portion to be replaced by said another new portion in said first row in said database and performs said second query on said database to replace said second portion with said another new portion in said first row.

22. The computing system of claim 21, wherein said user further sends an indication indicating that the editing of said XML data is complete, wherein said server system is designed to construct a new XML data from the modified data stored in the rows in said database in response to said indication, wherein said new XML data constructed contains said new portion in the place of said first portion and said another new portion in place of said second portion.

* * * * *

UNITED STATES PATENT AND TRADEMARK OFFICE

CERTIFICATE OF CORRECTION

PATENT NO. : 8,527,867 B2
APPLICATION NO. : 12/016205
DATED : September 3, 2013
INVENTOR(S) : Nair et al.

It is certified that error appears in the above-identified patent and that said Letters Patent is hereby corrected as shown below:

On the Title page, item [56]

On page 2, column 1, under other publications, line 8, delete "“Bidrectional” and insert -- “Bidirectional --, therefor.

In the Specification

In column 11, line 41, delete “edited)” and insert -- edited). --, therefor.

In column 14, line 25, delete "“UserPeroidType”" and insert -- “UserPeriodType” --, therefor.

In column 14, line 45, delete "“EnterPeroidName”" and insert -- “EnterPeriodName” --, therefor.

Signed and Sealed this
Seventeenth Day of December, 2013

Margaret A. Focarino

Margaret A. Focarino
*Commissioner for Patents of the United States Patent and Trademark Office*